United States Patent
Lee et al.

(10) Patent No.: US 12,525,073 B2
(45) Date of Patent: Jan. 13, 2026

(54) METHOD AND APPARATUS FOR PROVIDING INFORMATION ON MANAGEMENT OF A VEHICLE

(71) Applicants: HYUNDAI MOTOR COMPANY, Seoul (KR); KIA CORPORATION, Seoul (KR)

(72) Inventors: Hong Gyu Lee, Goyang-si (KR); Jung Seok Suh, Yongin-si (KR); Woo Hyun Kim, Suwon-si (KR); Ja Yoon Goo, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 310 days.

(21) Appl. No.: 18/106,197

(22) Filed: Feb. 6, 2023

(65) Prior Publication Data
US 2024/0127643 A1    Apr. 18, 2024

(30) Foreign Application Priority Data

Oct. 18, 2022  (KR) ......................... 10-2022-0133809

(51) Int. Cl.
*G07C 5/08*  (2006.01)
*G07C 5/10*  (2006.01)

(52) U.S. Cl.
CPC ............ *G07C 5/0816* (2013.01); *G07C 5/10* (2013.01)

(58) Field of Classification Search
CPC ..... B60W 2050/146; B60W 2540/215; B60W 50/0097; B60W 50/14; G07C 5/0816; G07C 5/10
See application file for complete search history.

(56) References Cited

U.S. PATENT DOCUMENTS

| | | | |
|---|---|---|---|
| 9,581,997 B1* | 2/2017 | Penilla | G01C 21/3469 |
| 10,043,388 B1* | 8/2018 | Kahn | G06Q 50/40 |
| 10,055,694 B2 | 8/2018 | Ichinose et al. | |
| 10,106,156 B1* | 10/2018 | Nave | B60K 28/14 |
| 10,391,873 B2* | 8/2019 | Köhnke | B60L 53/65 |
| 10,921,808 B2 | 2/2021 | Lee et al. | |
| 11,386,781 B1* | 7/2022 | Demisse | G06Q 10/02 |
| 11,458,862 B2* | 10/2022 | Scherer | B60L 53/67 |
| 11,803,183 B2* | 10/2023 | Nemec | B60W 60/007 |
| 2010/0023352 A1* | 1/2010 | Smith | G06Q 10/06 705/7.42 |
| 2011/0022256 A1* | 1/2011 | Asada | B60L 53/62 701/22 |

(Continued)

FOREIGN PATENT DOCUMENTS

| | | | | |
|---|---|---|---|---|
| CN | 116353508 A | * | 6/2023 | ......... B60R 16/0231 |
| CN | 117681670 A | * | 3/2024 | ............. B60K 35/23 |

(Continued)

*Primary Examiner* — Babar Sarwar
(74) *Attorney, Agent, or Firm* — Lempia Summerfield Katz LLC

(57) ABSTRACT

A method and an apparatus are for providing information on management of vehicle. A method of operating an electronic apparatus for providing a user with information on management of a vehicle includes generating a management scenario for the vehicle, requesting the user to approve the management scenario, and outputting management guide information based on progress of the user's exiting and progress of the management scenario.

20 Claims, 14 Drawing Sheets

(56) References Cited

U.S. PATENT DOCUMENTS

| | | | | |
|---|---|---|---|---|
| 2012/0330710 A1* | 12/2012 | Hauser | G06Q 10/10 | 705/7.15 |
| 2013/0311247 A1* | 11/2013 | Wass | G06Q 30/04 | 705/40 |
| 2015/0286979 A1* | 10/2015 | Ming | G06Q 10/063112 | 705/7.14 |
| 2015/0306969 A1* | 10/2015 | Sabripour | H02J 3/322 | 320/109 |
| 2018/0143035 A1* | 5/2018 | Ricci | B62D 15/0265 | |
| 2018/0164817 A1* | 6/2018 | Herz | G05D 1/646 | |
| 2018/0359611 A1* | 12/2018 | McNabb | H04W 36/18 | |
| 2018/0373249 A1* | 12/2018 | Choi | G01C 21/3492 | |
| 2019/0004528 A1* | 1/2019 | Zhan | G06F 9/4881 | |
| 2019/0171209 A1* | 6/2019 | Lee | G08G 1/143 | |
| 2019/0197798 A1* | 6/2019 | Abari | G06Q 10/02 | |
| 2019/0202445 A1* | 7/2019 | Lavoie | G05D 1/0022 | |
| 2019/0258238 A1* | 8/2019 | Lavoie | G05D 1/0033 | |
| 2020/0074753 A1* | 3/2020 | Adiga | G07F 17/244 | |
| 2020/0086852 A1* | 3/2020 | Krekel | B60W 50/14 | |
| 2020/0122744 A1* | 4/2020 | Badigannavar | G08G 1/147 | |
| 2020/0257284 A1* | 8/2020 | Hassani | B60W 50/10 | |
| 2020/0262307 A1* | 8/2020 | Rosene | H04L 67/52 | |
| 2020/0283022 A1* | 9/2020 | Hara | B60W 60/0025 | |
| 2020/0346638 A1* | 11/2020 | Benmimoun | B62D 15/0285 | |
| 2021/0090018 A1* | 3/2021 | Uçar | G06Q 10/0832 | |
| 2021/0103288 A1* | 4/2021 | Nemedi | G06Q 10/047 | |
| 2021/0241545 A1* | 8/2021 | Hayashida | G07C 5/0841 | |
| 2021/0304525 A1* | 9/2021 | Terauchi | G06Q 10/0833 | |
| 2022/0055620 A1* | 2/2022 | Gassmann | G06V 20/59 | |
| 2022/0164747 A1* | 5/2022 | Shah | G01C 21/3676 | |
| 2022/0242458 A1* | 8/2022 | Xiao | G01C 21/32 | |
| 2022/0306090 A1* | 9/2022 | Noguchi | B60W 30/181 | |
| 2022/0405834 A1* | 12/2022 | Anthony | G06Q 20/102 | |
| 2023/0242111 A1* | 8/2023 | Aggoune | B60W 20/12 | 701/22 |
| 2023/0311898 A1* | 10/2023 | Quint | G01C 21/3605 | 701/1 |
| 2023/0347776 A1* | 11/2023 | McLachlan | B60L 58/13 | |
| 2023/0351518 A1* | 11/2023 | Amancha | G06Q 40/08 | |
| 2023/0373339 A1* | 11/2023 | Hermez | G06Q 50/06 | |
| 2023/0417564 A1* | 12/2023 | Salter | G06Q 30/0278 | |
| 2024/0029092 A1* | 1/2024 | Simpson | G06Q 50/40 | |
| 2024/0092209 A1* | 3/2024 | Overfield | B60L 53/31 | |
| 2024/0092377 A1* | 3/2024 | Chang | B60K 35/60 | |
| 2024/0416779 A1* | 12/2024 | Boucher | B60L 53/51 | |

FOREIGN PATENT DOCUMENTS

| | | | | |
|---|---|---|---|---|
| EP | 3809348 A1 * | 4/2021 | | G07C 5/085 |
| JP | 6793884 B2 | 12/2020 | | |
| KR | 101908422 B1 | 10/2018 | | |
| KR | 101979268 B1 | 5/2019 | | |
| KR | 20190123361 A | 11/2019 | | |
| KR | 102058049 B1 | 1/2020 | | |
| KR | 102280938 B1 * | 7/2021 | | B60L 3/0069 |
| KR | 20220058495 A | 5/2022 | | |
| WO | WO-2007026947 A1 * | 3/2007 | | B60K 6/442 |

* cited by examiner

METHOD AND APPARATUS FOR PROVIDING INFORMATION ON MANAGEMENT OF A VEHICLE

CROSS-REFERENCE TO RELATED APPLICATION

The present application claims priority to Korean Patent Application No. 10-2022-0133809, filed on Oct. 18, 2022, in Korea, the entire contents of which are incorporated herein by reference.

TECHNICAL FIELD

The present disclosure relates to a method and apparatus for providing information on management of a vehicle.

BACKGROUND

The content described in the present section merely provides background information on the present embodiment and does not constitute the prior art.

A vehicle may provide various pieces of information for the convenience of a user. As the form of usage of a vehicle is diversified, there is a need for a technology capable of providing information necessary to a user at an appropriate time as well as simply outputting information sensed by a sensor mounted on the vehicle. In particular, as autonomous vehicles are being actively developed, a technology capable of providing various pieces of information to a user using various pieces of data acquired by the autonomous vehicle is required.

SUMMARY

An aspect of the present disclosure is directed to providing a method of operating an electronic apparatus for providing a user with information on management of a vehicle. The method includes: generating a management scenario for the vehicle; requesting the user to approve the management scenario; and outputting management guide information, based on progress of the user's exiting and progress of the management scenario.

Another aspect of the present disclosure is directed to providing an electronic apparatus for providing a user of a vehicle with information. The apparatus includes a controller configured to: generate a management scenario for the vehicle; control an interface provided in the vehicle to request the user to approve the management scenario; and control the interface to output management guide information based on progress of the user's exiting and progress of the management scenario.

Another aspect of the present disclosure is directed to providing a vehicle including an interface unit configured to transmit information between the vehicle and a user and including a controller. The controller is configured to: generate a management scenario for the vehicle; control the interface unit to request the user to approve the management scenario; and control the interface unit to output management guide information based on progress of the user's exiting and progress of the management scenario.

DETAILED DESCRIPTION

Figure 1:
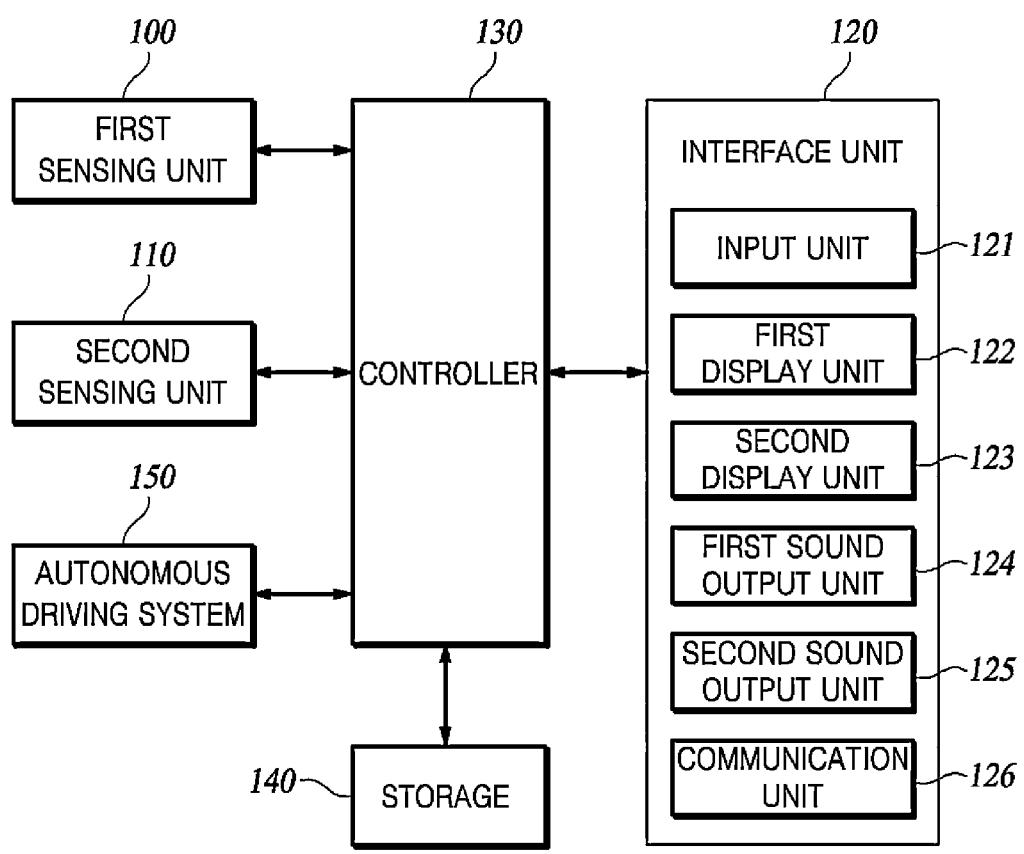
FIG. 1 is a block diagram illustrating components of a vehicle according to an embodiment of the present disclosure.

In view of the above, the present disclosure provides a method and an apparatus that can determine a management task required for a vehicle and provide related information to a user, thus increasing convenience for vehicle management.

The present disclosure provides a method and an apparatus that can provide personalized information to a user exiting a vehicle.

The present disclosure provides a method and an apparatus that can determine the time and method of providing guide information based on a user's exiting progress and the progress of a management scenario to the user, thus effectively delivering information about a management task to the user.

The objectives to be achieved by the present disclosure are not limited to the above-mentioned objectives. Other objectives, which are not mentioned should be clearly understood by those having ordinary skill in the art from the following description.

Hereinafter, some exemplary embodiments of the present disclosure are described in detail with reference to the accompanying drawings. In the following description, like reference numerals designate like elements, although the elements may be shown in different drawings. Furthermore, in the following description of some embodiments, a detailed description of known functions and configurations incorporated therein are omitted for clarity and brevity.

Additionally, various terms such as "first," "second," "A," "B," "(a)," "(b)," and the like, are used solely to differentiate one component from the other but not to imply or suggest the substances, order, or sequence of the components. Throughout the present specification, when a part "includes" or "comprises" a component, the part is meant to further include other components, not to exclude thereof unless specifically stated to the contrary.

The following detailed description, together with the accompanying drawings, is intended to describe exemplary embodiments of the present disclosure and is not intended to represent the only embodiments in which the present disclosure may be practiced.

FIG. 1 is a block diagram illustrating components of a vehicle according to an embodiment of the present disclosure.

Referring to FIG. 1, the vehicle 10 may include all or some of a first sensing unit 100, a second sensing unit 110, an interface unit 120, a controller 130, a storage 140, and an autonomous driving system 150. Each of the components may be a device mounted on the vehicle 10 or logic and may refer to a unit that processes at least one function or task, which may be implemented as hardware, software, or a combination of hardware and software. All blocks shown in FIG. 1 are not essential components. In another embodiment, some blocks included in the vehicle 10 may be added, changed, or eliminated.

The components of the vehicle 10 may exchange signals via an internal communication system (not shown). The signals may include data. The internal communication system may use at least one communication protocol (e.g., controller area network (CAN), local interconnect network (LIN), FlexRay, mobile open systems technologies (MOST), Ethernet).

A guide apparatus according to an embodiment of the present disclosure may include one or more devices mounted on the vehicle 10 or logic. For example, the guide apparatus may include the controller 130 and the storage 140. As another example, the guide apparatus may include any one or more of the first sensing unit 100, the second sensing unit 110, and the interface unit 120, or the function of the guide apparatus may be incorporated into the autonomous driving system 150.

The first sensing unit 100 may sense the state of the vehicle.

In an embodiment, the first sensing unit 100 may acquire sensing signals for a remaining battery level, a remaining fuel level of the vehicle 10, and/or whether a door is opened or closed and/or whether the door is locked. The first sensing unit 100 may include one or more of a battery sensor, a fuel sensor, and/or a door sensor. Here, the door may include a first door that may be selectively opened so that a user gets in or out of the vehicle 10 and/or a second door for opening or closing a cargo compartment of the vehicle 10. For example, the first door may include one or more of a front door and a rear door, and the second door may include one or more of a trunk door, i.e., a trunk lid, and a frunk door, i.e., a hood. However, the present disclosure is not limited thereto.

In another embodiment, the first sensing unit 100 may additionally acquire sensing signals for the posture, direction, position, angle, speed, acceleration, slope, steering wheel rotating angle, collision information, tire information, lamp information, internal temperature, internal humidity, and/or external illuminance of the vehicle 10. The first sensing unit 100 may further include one or more of a posture sensor, a position module, a wheel sensor, a speed sensor, an inclination sensor, a weight sensor, a heading sensor, a yaw sensor, a gyro sensor, a steering sensor, a collision sensor, a tire sensor, a vehicle internal temperature sensor, a vehicle internal humidity sensor, an ultrasonic sensor, and/or an illuminance sensor. The position module may include a global positioning system (GPS) module for receiving GPS information.

The second sensing unit 110 may detect an object that is located inside or outside the vehicle 10. Here, the object may include a user of the vehicle 10 and/or luggage. The second sensing unit 110 may include one or more of a camera, a radar, a lidar, an ultrasonic sensor, an infrared sensor, a weight sensor, and/or a bio-signal detection sensor, but the present disclosure is not limited thereto.

In an embodiment, the second sensing unit 110 may further include a processor for detecting the object or identifying the position at which the object is detected, based on data that is output by one or more sensors, but the present disclosure is not limited thereto. In another embodiment, the above-described function may be performed by the controller 130.

The interface unit 120 is an apparatus for interaction with a user or an external device. The interface unit 120 may receive various pieces of information from the user or the external device, and/or may transmit information generated by the controller 130 to the user or the external device. The interface unit 120 may include all or some of an input unit 121, a first display unit 122, a second display unit 123, a first sound output unit 124, a second sound output unit 125, and/or a communication unit 126.

The input unit 121 may receive an input for setting or changing setting values of various functions from a user. For instance, the input unit 121 may receive a command of approval, disapproval, or change for a management scenario, which is described later, from a passenger. The input unit 121 may be implemented as a physical button, a touch panel, and/or a microphone. The input unit 121 may be coupled to the first display unit 122 to implement a touch display.

The first display unit 122 may output information about the vehicle 10 using a graphic user interface (GUI) to at least one area inside the vehicle 10. The internal area of the vehicle 10 may be, for instance, an area of a seat, an area of a windshield, an area of a window, an area of a steering wheel, an area of a door, an area of a center console, an area of an instrument panel, an area of each pillar, an area of headlining and/or an area of a sun visor, but the present disclosure is not limited thereto. The first display unit 122 may include, for instance, one or more of a display, a head-up display (HUD), and/or a light-emitting diode (LED), but the present disclosure is not limited thereto and may be implemented in other ways as long as information may be displayed in any area inside the vehicle 10.

The second display unit 123 may output information about the vehicle 10 using the GUI to at least one area outside the vehicle 10. The external area of the vehicle 10 may be, for instance, an area of the ground, an area of the windshield, an area of the window, an area of a door, an area of each pillar, and/or an area of a bumper, but the present disclosure is not limited thereto. The second display unit 123 may include, for instance, one or more of a display, an LED strip, and/or a light lamp that outputs information of the vehicle 10 toward a road surface, but the present disclosure is not limited thereto. The second display unit 123 may be implemented in other ways as long as information may be displayed in any area outside the vehicle 10.

The first sound output unit 124 may output information about the vehicle 10 to the inside of the vehicle using an auditory user interface (AUI). The first sound output unit 124 may be a speaker that outputs voice and/or notification sound to the inside of the vehicle, but the present disclosure is not limited thereto. The first sound output unit 124 may be implemented in other ways as long as sound may be output to the inside of the vehicle 10.

The second sound output unit 125 may output information about the vehicle 10 to the outside of the vehicle 10 using the AUI. The second sound output unit 125 may be implemented as a speaker that outputs voice and/or notification sound to the outside of the vehicle, but the present disclosure is not limited thereto. The second sound output unit 125 may be implemented in other ways as long as sound may be output to the outside of the vehicle 10.

The communication unit 126 is an apparatus for communicating with the external device. Here, the external device may be another vehicle, a user's terminal, and/or a server. Here, the user's terminal may be a mobile device, such as a smartphone, a smartwatch, or a tablet.

In an embodiment, the communication unit 126 may communicate with the external device using a wireless communication method. The communication unit 126 may include at least one of a transmission antenna, a reception antenna, a radio frequency (RF) circuit capable of implementing various communication protocols, and an RF element.

The communication unit 126 according to another embodiment may communicate with the external device using a wired communication method such as universal serial bus (USB) data communication.

The controller 130 performs calculations and controls related to vehicle management and/or guide information provision, in conjunction with one or more of the first sensing unit 100, the second sensing unit 110, the interface unit 120, the storage 140, and the autonomous driving system 150. The controller 130 may include one or more processors. The controller 130 may be implemented as one or more electronic control units (ECUs), microcontroller units (MCUs), or other sub-controllers mounted on the vehicle.

The controller 130 may acquire information about the vehicle, information about the user, and/or information about the external environment, using at least one of the first sensing unit 100, the second sensing unit 110, the interface unit 120, and the storage 140.

Table 1 shows an example of information that may be acquired by the controller 130.

the user's terminal using the communication unit 126. As a further example, the controller 130 may acquire the list of management facilities and/or the list of POIs near a position where the vehicle 10 is to be parked or a position where a user exits from the server using the communication unit 126. Here, the management facility is a facility capable of performing the management task, and may be, for instance, a charging station, a repair shop, a car wash, or a parking lot, but the present disclosure is not limited thereto. As a further example, the controller 130 may acquire at least one of the vehicle management history, the user's schedule, and the management preference pattern, which are previously stored in the storage 140.

The controller 130 may generate a management scenario for the vehicle, based on at least one piece of acquired information. Here, the management scenario may define one or more management tasks that are to be performed after a user exits a vehicle, positions at which corresponding management tasks are to be performed, and/or a sequence of the management tasks. Here, the management task may include, for instance, one or more of a charging task, a repairing task, a car washing task, and a parking task.

The controller 130 may determine one or more management tasks that are to be performed after the user exits the vehicle, the positions at which the corresponding management tasks are to be performed, and/or the sequence of the management tasks. To determine the above, the controller 130 may use at least one of the information about the vehicle 10, the information about the user, and/or the information about the external environment.

The controller 130 may add a basic management task determined to be necessary for the operation of the vehicle

TABLE 1

| Item | Information | Contents |
|---|---|---|
| Vehicle | Door state | Open, close and/or lock state of each door |
| | Power source state | Remaining battery level and/or remaining fuel level, and the like. |
| | Management history | Date when repair and/or car wash was performed |
| User | User position | Position where user is detected inside or outside vehicle |
| | Schedule | User's schedule (ex. Destination, time, and the like.) |
| | Luggage state | Presence, type, and/or detected position of luggage |
| | Management designation input | Management task and/or management sequence requested by user |
| | Management preference pattern | Management task and/or management sequence preferred by user |
| | Point of Interest (POI) visit history | Types of POIs visited by user |
| External environment | List of Management facility | Position, cost, task history, and the like, of management facility (charging station, repair shop, car wash, parking lot, and the like.) |
| | List of POI | Types, positions, and/or grades of POIs |

For example, the controller 130 may acquire the door state information of the vehicle 10 and/or the power source state information from the first sensing unit 100. As another example, the controller 130 may acquire the user position information and/or the luggage state information from the second sensing unit 110. As a further example, the controller 130 may acquire management designation input from the input unit 121. As a further example, the controller 130 may acquire at least one of the user's schedules, the management designation input, the management preference pattern, the vehicle management history, and the POI visit history from

10 and/or an additional management task according to a user's preference to the management scenario.

For example, the controller 130 may add the parking task as the basic management task to the management scenario. The controller 130 may add the parking task as a last order in the management scenario. As another example, the controller 130 may determine whether to add the parking task as the basic management task to the management scenario, based on the user's schedule and the expected required time of other management tasks in the management scenario. For example, the controller 130 may calculate the time at which the user is expected to return to the vehicle and the time at which other management tasks are expected to be completed. The controller 130 also may not add the parking task to the management scenario if a difference between the calculated times is within a preset threshold.

The controller 130 may determine a position where the parking task is to be performed (i.e., a position where the vehicle 10 is to be parked) using the management facility list. For example, the controller 130 may determine an available parking space that is closest to the user's destination as the position to park the vehicle 10. As another example, the controller 130 may determine the available parking space having the lowest parking fee as the position to park the vehicle 10.

The controller 130 may determine whether to include the charging task as the basic management task in the management scenario. The controller 130 may determine whether to include the charging task in the management scenario, based on the travelable distance and/or required travel distance of the vehicle. For example, when a between the travelable distance and required travel distance of the vehicle is equal to or less than a preset threshold, the controller 130 may add the charging task as the basic management task to the management scenario. As another example, when the travelable distance of the vehicle is equal to or less than the preset threshold, the controller 130 may add the charging task as the basic management task to the management scenario.

The controller 130 may calculate the travelable distance and required travel distance of the vehicle from the power source state information of the vehicle and the user's schedule. As another example, the controller 130 may acquire the travelable distance and required travel distance of the vehicle from the first sensing unit 100, the interface unit 120, and/or the storage.

The controller 130 may determine a charging facility for performing the charging task using the management facility list. For example, the controller 130 may check in the management facility list the charging station within a preset distance from a position where a user exits and/or a position where the vehicle 10 is to be parked, but the present disclosure is not limited thereto. The controller 130 may determine a charging method (wired or wireless) when determining the charging facility.

The controller 130 may determine whether to include the repairing task as the basic management task in the management scenario. The controller 130 may determine whether to include the repairing task in the management scenario, using the history information of the repairing task and the management facility list. As one example, the controller 130 may add the repairing task to the management scenario, in the case that a preset period has elapsed from a time when the repairing task was performed in the past, and a maintenance facility exists within a preset distance from a position where a user exits and/or a position where the vehicle 10 is to be parked. As another example, the controller 130 may add the repairing task to the management scenario when an abnormal state of the vehicle 10 is detected. The controller 130 may acquire the detection information about the abnormal state of the vehicle 10 from the first sensing unit 100.

The controller 130 may determine whether to include the car washing task as the basic management task in the management scenario. The controller 130 may determine whether to include the car washing task in the management scenario, using the history information of the car washing task and the management facility list. As one example, the controller 130 may add the car washing task to the management scenario, in the case that a preset period has elapsed from a time in the past when the car washing task was performed, and a car washing facility exists within a preset distance from a position where a user exits and/or a position where the vehicle 10 is to be parked.

The controller 130 may calculate an expected required time and/or expected required cost of each management task. The controller 130 may calculate the expected required time and/or the expected required cost, by referring to the management facility list or obtaining real-time information about the management facility through the communication unit 126, but the present disclosure is not limited thereto.

The controller 130 may determine the sequence of basic management tasks.

In an embodiment, the controller 130 may determine the sequence of the basic management tasks according to a sequence that is preset by a manufacturer. For instance, the controller 130 may determine the management sequence in the order of charging, repairing, car washing, and parking.

In another embodiment, the controller 130 may determine the sequence of the basic management tasks by accounting for a position where a user exits and/or a position where the vehicle 10 is to be parked. The controller 130 may determine the sequence of the management tasks to minimize a movement path between the positions where the management tasks are to be performed from a position where a user exits.

In another embodiment, the controller 130 may determine the sequence of the basic management tasks, based on the management designation input and/or the management preference pattern.

The controller 130 may determine one or more management tasks among the management tasks which are not included in the management scenario as additional management tasks.

The controller 130 may determine an additional management task, based on the management designation input and/or the management preference pattern. A user may designate in advance through the input unit 121 or the terminal one or more management tasks that are to be performed after the user exits or after a specific management task.

The controller 130 may add the additional management task to the management scenario or may generate a recommended scenario to which the additional management task is added. At this time, the controller 130 may give the management task according to the management designation input a priority higher than that of the management task according to the management preference pattern. For instance, when both the additional management task according to the management designation input and the additional management task according to the management preference pattern exist, the controller 130 may add only the additional management task according to the management designation input to the management scenario (or, recommended scenario), or may add the additional management task according to the management designation input as a preceding task to the management scenario (or, recommended scenario).

Table 2 illustrates the final generated management scenario according to the user's management designation input and/or management preference pattern when the repairing task and the parking task are determined as the basic management task.

TABLE 2

|   | Designation Input | Preference Pattern | Management Scenario |
|---|---|---|---|
| 1 | No | No | Repair → Park |
| 2 | Charge | No | Repair → Charge → Park |
| 3 | No | Car wash | Repair → Car wash → Park |
| 4 | Charge | Car wash | Repair → Charge → Park |

The controller 130 may determine the sequence of the basic management tasks and the additional management tasks. As one example, the controller 130 may add additional management tasks between basic management tasks other than the parking task and the parking task. As another example, the controller 130 may determine the sequence of the basic management tasks and the additional management tasks, according to the management designation input and/or management preference pattern. For instance, in the example of Table 2, when the user designates to perform the charging task after the repairing task, the controller 130 may generate the management scenario (or additional scenario) in the sequence of repairing, charging, and parking. Furthermore, when it is determined that the user prefers to perform the car washing task after the repairing task, based on the management preference pattern, the controller 130 may generate the management scenario (or additional scenario) in the sequence of repairing, car washing, and parking.

According to embodiments, only when the basic management tasks add preset conditions, the controller 130 may add the additional management task to the management scenario (or, recommended scenario). As one example, only when the basic management task that is to be performed first is repairing or car washing, the controller 130 may add the additional management task in a turn following the corresponding basic management task. As another example, only when the number of basic management tasks is within a preset number, the controller 130 may add an additional management task. As another example, only when a total required time of basic management tasks other than the parking task is equal to or less than a preset threshold, the controller 130 may add the additional management task. As another example, only when a total required cost of basic management tasks is equal to or less than a preset threshold, the controller 130 may add the additional management task.

The controller 130 may request approval of the management scenario from a user using the interface unit 120. For example, the controller 130 may receive a user's approval command through the input unit 121 and/or the terminal.

The controller 130 may provide one or more recommended scenarios to a user, along with an approval request for the management scenario. The controller 130 may receive a selection of any one of one or more recommended scenarios through the input unit 121 and/or the terminal. The controller 130 may change the management scenario into the selected recommended scenario.

The controller 130 may provide information related to the management of the vehicle 10 to the user, using the interface unit 120. The controller 130 may guide the progress of the management scenario and the details of each management task included in the management scenario to the user.

The controller 130 may also provide the exiting guide information to allow a user to conveniently exit when providing the information related to the management of the vehicle 10 to the user. The exiting guide information may include, for instance, the presence of luggage in the vehicle, information indicating the position of the luggage, and/or information guiding a path from a position where a user exits to a destination.

The controller 130 may determine the destination based on the user's schedule or may decide on a recommended destination based on the POI list. When there is no appointment or reservation information in the user's schedule, the controller 130 may decide on the recommended destination and then suggest it to the user. As one example, the controller 130 may decide, as the recommended destination, a tourist site, an event area, or a restaurant among points of interest (POIs) within a preset distance from the position where a user exits. As another example, the controller 130 may decide based on the user's POI visit history, the POI similar to a user's preferred POI as the recommended destination.

Table 3 shows an example of various types of guide information that the controller 130 may provide to the user by using the interface unit 120.

TABLE 3

| Item | | Contents | Class |
|---|---|---|---|
| Exiting guide | Luggage | Presence and/or position of luggage | 0 |
| | Destination | Path summary, direction, remaining time before schedule, and/or nearby event, and the like. | 0 |
| Management Guide | Common | Management scenario, recommended scenario | 0 |
| | Charge | Vehicle's battery state, travelable distance, expected charging place, charging method, expected required time, and/or cost, and the like. | 1 |
| | Repair | Inspection required state, replacement required state, surrounding reservable repair shop, expected required time and/or cost, and the like. | 2 |
| | Car wash | Car wash period, surrounding reservable car wash, expected required time and/or cost, and the like. | 3 |
| | Park | Parking position (text and map), expected parking and/or cost, and the like. | 4 |

Here, the class may indicate the importance of an item that needs to be delivered when the user exits. In this case, the class between the management tasks may vary according to the sequence in the management scenario.

The controller 130 may give priority to each class. For instance, in the example of Table 3, when the user exits, the controller 130 may deliver detailed information about the charging and repairing tasks and may provide brief information about car washing and parking. As another example, the controller 130 may give priority to the charging and repairing tasks by highlighting and outputting a place where the task is to be performed. As another example, the controller 130 may provide information using more media as the priority becomes higher.

The controller 130 may provide a different transmission path for each piece of information to a user. For example, the controller 130 may change whether the information is output, the form of providing information, and guide contents for each medium.

Table 4 shows an example of a method in which various types of information generated by the controller 130 are delivered to a user. In this table, '○' indicates that information is provided using a corresponding medium or form, and a blank indicates that information is not provided using the corresponding medium or form.

The controller 130 may decide on an information output method for the interface unit 120, based on the user's exiting progress.

The controller 130 may determine the user's exiting progress, based on the position of the user and/or the state of the door. Here, the user's exiting progress may be determined as any one of a state before exiting, a state during exiting, and a state where exiting is completed.

As one example, when the user is detected inside the vehicle 10 and/or when all doors are locked or closed, the controller 130 may determine the exiting progress as the state before exiting. As another example, when the user is detected outside the vehicle 10 and/or when at least one door is switched to an unlocked or opened state, the controller 130 may determine the exiting progress as the state during exiting. As another example, when the user is detected outside the vehicle 10 and/or when all the doors are switched to a locked state, the controller 130 may determine the exiting progress as the state where exiting is completed.

Table 5 shows an example of the information output method of the interface unit 120 according to the user's exiting progress. In this table, 'O' indicates that the corresponding medium is used, 'x' indicates that the corresponding medium is not used, and 'A' indicates that the use of the medium may vary depending on a situation inside/outside the vehicle.

TABLE 4

| | | | First Display unit/ Communication unit | Second display unit | | | Sound output unit |
|---|---|---|---|---|---|---|---|
| | | | | Vehicle Exterior | Ground Text | Image | |
| Exit | Luggage | Position | ○ | ○ | | ○ | |
| | | Presence | | | | | ○ |
| | Destination | Path | ○ | | | ○ | |
| | | Distance | ○ | ○ | ○ | | |
| | | Arrival time | ○ | ○ | ○ | | |
| | | Direction | ○ | | | ○ | |
| Management | Common | Travelable Distance | ○ | | | | |
| | | Scenario | ○ | ○ | ○ | | |
| | | Approval request | ○ | ○ | ○ | | ○ |
| | Task | Place | ○ (Text/Button) | ○ (Text) | | ○ (Map) | |
| | | Expected time | ○ | ○ | ○ | | ○ |
| | | Cost | ○ | ○ | | | |
| | | Details | ○ | | | | |

As one example, when the luggage is present inside the vehicle 10, the controller 130 may guide the exact position of the luggage through the first display unit 122, the second display unit 123, and/or the communication unit 126, or may guide only the presence of the luggage through the first sound output unit 124 and/or the second sound output unit 125.

As another example, the controller 130 may control the first display unit 122 to output a place where the management task is to be performed to at least one area inside the vehicle in the form of a text or a button, and may control the second display unit 123 to output a place where the management task is to be performed to at least one area on the exterior of the vehicle in the form of a text, and to output a place where the management task is to be performed to at least one area of the ground in the form of a map image.

TABLE 5

| Exit progress | First display unit | Second display unit | First sound output unit | Second sound output unit | Communication unit |
|---|---|---|---|---|---|
| Before Exit | ○ | x | ○ | x | Δ |
| During Exit | Δ | ○ | Δ | ○ | ○ |
| Exit completed | x | ○ | x | ○ | ○ |

Referring to table 5, the output method according to the exiting progress may be determined by the combination of one or more of a first method of visually outputting information to at least one area inside the vehicle 10 using the first display unit 122, a second method of visually outputting information to at least one area outside the vehicle 10 using the second display unit 123, a third method of audibly outputting information to the inside of the vehicle 10 using the first sound output unit 124, a fourth method of audibly outputting information to the outside of the vehicle 10 using the second sound output unit 125, and a fifth method of transmitting information to the user's terminal using the communication unit 126.

As one example, when it is determined as the state before the user exits, the controller 130 may output approval request and/or guide information, using the combination of the first method and the third method. At this time, when it is determined that the user is using the terminal or it is difficult to check approval and/or guide information using the first display unit 122, the controller 130 may output the approval request and/or the guide information by additionally using the fifth method.

As another example, when it is determined as the state while the user is exiting, the controller 130 may output approval request and/or guide information, using the combination of the second method, fourth method, and fifth method. At this time, the controller 130 may further use the first method and/or the third method according to the position of the user and the state of the door. For instance, when it is detected that a trunk door is opened and/or the user is positioned around the trunk outside the vehicle, the controller may further use the first method and the third method.

As another example, when it is determined as the state where the user has gotten off, the controller 130 may output approval request and/or guide information, using the combination of the second method, fourth method, and fifth method.

The controller 130 may decide the using mode of the first method and/or the third method, based on the position of the user and/or the state of the door. Here, the using mode of the first method may include at least one area inside the vehicle 10 corresponding to the first display unit 122, and the using mode of the third method may include the use of the first sound output unit 124.

Table 6 shows an example of the using mode of the first and third methods according to the position of the user and/or the state of the door.

the corresponding area, and may include, for instance, an area of a first-row seat, an area of a second-row window, an area of a second-row door, and/or an area of the pillar, but is not limited thereto.

The controller 130 may select an area to which information is to be output, among the first-row visible area and the second-row visible area, based on the position of the user and/or the state of the door.

As one example, when it is detected that the user is sitting in the first-row seat inside the vehicle, the controller 130 may decide the first-row visible area as the area for outputting information. As another example, when it is detected that the user is sitting in the second-row seat inside the vehicle, the controller 130 may decide the second-row visible area as the area for outputting information. As another example, when it is detected that the trunk door is opened and/or when it is detected that the user is positioned near the trunk outside the vehicle, the controller 130 may decide the second-row visible area is the area for outputting information.

The controller 130 may decide whether to use the first sound output unit 124, based on the position of the user and/or the state of the door.

As one example, when it is detected that the user is inside the vehicle, the controller 130 may output information using the first sound output unit 124. As another example, when it is detected that the trunk door is opened and/or when it is detected that the user is positioned near the trunk outside the vehicle, the controller 130 may output the information using the first sound output unit 124.

When there are multiple users, the controller may output information by combining the output method corresponding to each user and/or the using mode. For example, when the trunk door is opened and the users are detected both in the first-row seat inside the vehicle and around the trunk outside the vehicle, the controller 130 may output information through all output methods and using modes.

As described above, according to an embodiment of the present disclosure, it is possible to effectively receive information regardless of the position of the user, by varying the

TABLE 6

| | | | First display unit | | |
|---|---|---|---|---|---|
| Exit progress | User position | Door state | First-row visible | Second-row visible | First sound output unit |
| Before exit | First row | Closed | o | x | o |
| | Second row | Closed | x | o | o |
| During exit | Near trunk | Open | x | o | o |
| | Near frunk | — | x | x | x |
| During exit/complete | Near door | — | x | x | x |

Referring to table 6, the using mode of the first method may include a first-row visible area and a second-row visible area. Here, the first-row visible area is an area in which a user sitting in the first row is expected to be able to identify information that is output to the corresponding area, and may include, for instance, an area of the windshield, an area of the window, an area of the steering wheel, an area of the door, an area of the center console, an area of the instrument panel, an area of the pillar and/or an area of the sun visor, but is not limited thereto. Likewise, the second-row visible area is an area in which a user sitting in the second row is expected to be able to identify information that is output to output method and/or using mode depending on the position of the user or the state of the door.

The controller 130 may decide a time when the approval request and/or various pieces of guide information are to be transmitted, contents, and/or media, based on the user's exiting progress and/or the progress of the management scenario. Here, the progress of the management scenario may include the progress for the approval request of the management scenario and/or the progress for performing the management task in the management scenario.

As one example, the controller 130 may request the user to approve the management scenario through the first display unit 122, before the user exits. Here, the controller 130 may transmit the approval request to the user before a preset time from the time when the user is expected to arrive at a position where the user exits.

As another example, when the user exits without responding to the approval request for the management scenario, the controller 130 may transmit the approval request through the communication unit 126 to the user's terminal. Furthermore, the controller 130 may control the second display unit 123 to output information, guiding that the user may respond to the approval request using the user's terminal, to at least one area outside the vehicle 10. Thus, the user may approve or change the management scenario using the terminal outside the vehicle 10.

As another example, when the user's exiting is completed while the management scenario has been approved, the controller 130 may control the second display unit 123 to output information indicating that the management scenario is approved and information indicating the management task which is first to be performed in the management scenario in at least one area outside the vehicle. Thus, the user may confirm that the vehicle 10 is scheduled to perform the management task soon without checking the inside of the vehicle 10 or the terminal.

As another example, when the user disapproves of the management scenario and the user's exiting is completed, the controller 130 may control the second display unit 123 to output information indicating that the vehicle 10 is scheduled to perform the parking task to at least one area outside the vehicle 10. Thus, the user may, without checking the inside of the vehicle 10 or the terminal, check that the approval is rejected and that the vehicle 10 is scheduled to perform the parking task soon. On the other hand, the controller 130 may determine that the user disapproves of the management scenario when the user inputs a disapproval command or when the approval command is not input within a preset time from the time when the exiting is completed.

As another example, when the user's exiting is completed and the vehicle 10 starts to perform the management task, the controller 130 may transmit the progress for the management task through the communication unit 126 to the user's terminal. The controller 130 may transmit a management task that is being currently performed by the vehicle, a recently completed management task, a management task that is scheduled to be performed next, a current position of the vehicle and/or a moving path, and the like to the user's terminal.

The storage 140 may store various programs and data for providing guide information according to an embodiment of the present disclosure. As one example, the storage 140 may store a program for generating the management scenario and/or guide information by the controller 130. As another example, the storage 140 may store a standard for deciding whether to include at least one management task in the management scenario. As another example, the storage 140 may store a management scenario or history information on at least one management task in the management scenario. As another example, it is possible to store a user's preference information in the management scenario or at least one management task in the management scenario. As another example, the storage 140 may store the user's visit history information on at least one POI.

The autonomous driving system 150 may control the movement of the vehicle 10, based on the management scenario. According to embodiments, the autonomous driving system 150 may include one or more processors and memories.

According to embodiments, the autonomous driving system 150 may generate a path for driving the vehicle 10. For example, the autonomous driving system 150 may generate a path for sequentially moving from a position where the user exits to positions corresponding to respective management tasks in the management scenario. The autonomous driving system 150 may generate a driving plan for driving along the generated path of the vehicle 10. The autonomous driving system 150 may generate a signal for controlling the movement of the vehicle 10 according to the driving plan. The autonomous driving system 150 may control various driving devices (not shown) in the vehicle 10 through the generated signal. The driving devices may include, for instance, a steering device, a braking device, a suspension device, and/or a power train.

Figure 2:
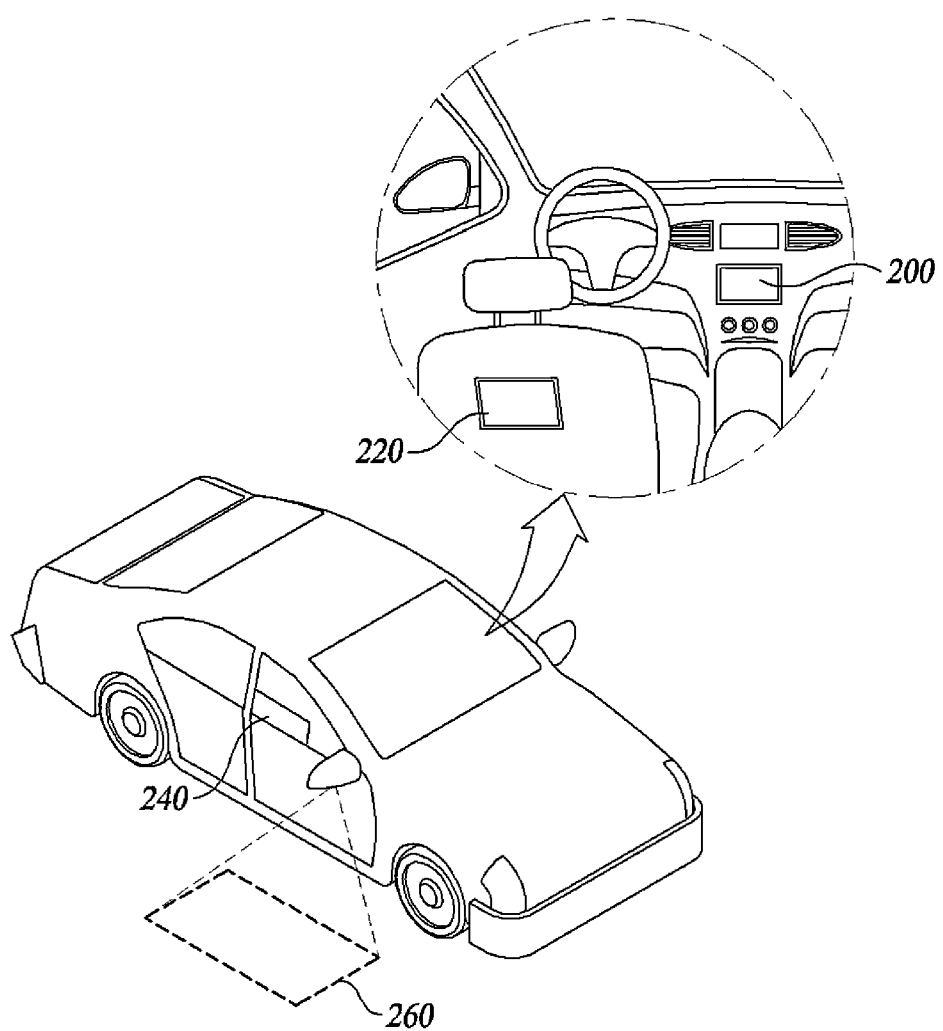
FIG. 2 is a diagram illustrating an example of areas in which an interface unit outputs information according to an embodiment of the present disclosure.

FIG. 2 is a diagram illustrating an example of areas in which the interface unit outputs information according to an embodiment of the present disclosure.

As shown in FIG. 2, the controller 130 may control so that the interface unit 120 outputs a graphic user interface (GUI) to at least one area 200 and/or 220 inside the vehicle 10 and/or to at least one area 240 and/or 260 outside the vehicle 10. As one example, the controller 130 may control so that the first display unit 122 outputs the GUI to at least one area 200 and/or 220 inside the vehicle 10. As another example, the controller 130 may control such that the second display unit 123 outputs the GUI to at least one area 240 on the exterior of the vehicle 10. As another example, the controller 130 may control such that the second display unit 123 outputs the GUI to at least one area 260 on the ground.

FIGS. 3A-3D are diagrams illustrating an example of the GUI displayed by the interface unit according to an embodiment of the present disclosure.

FIGS. 3A-3D show an example in which the controller 130 generates the management scenario in the order of the repairing task and the parking task, but the present disclosure is not limited thereto.

Figure 3A:
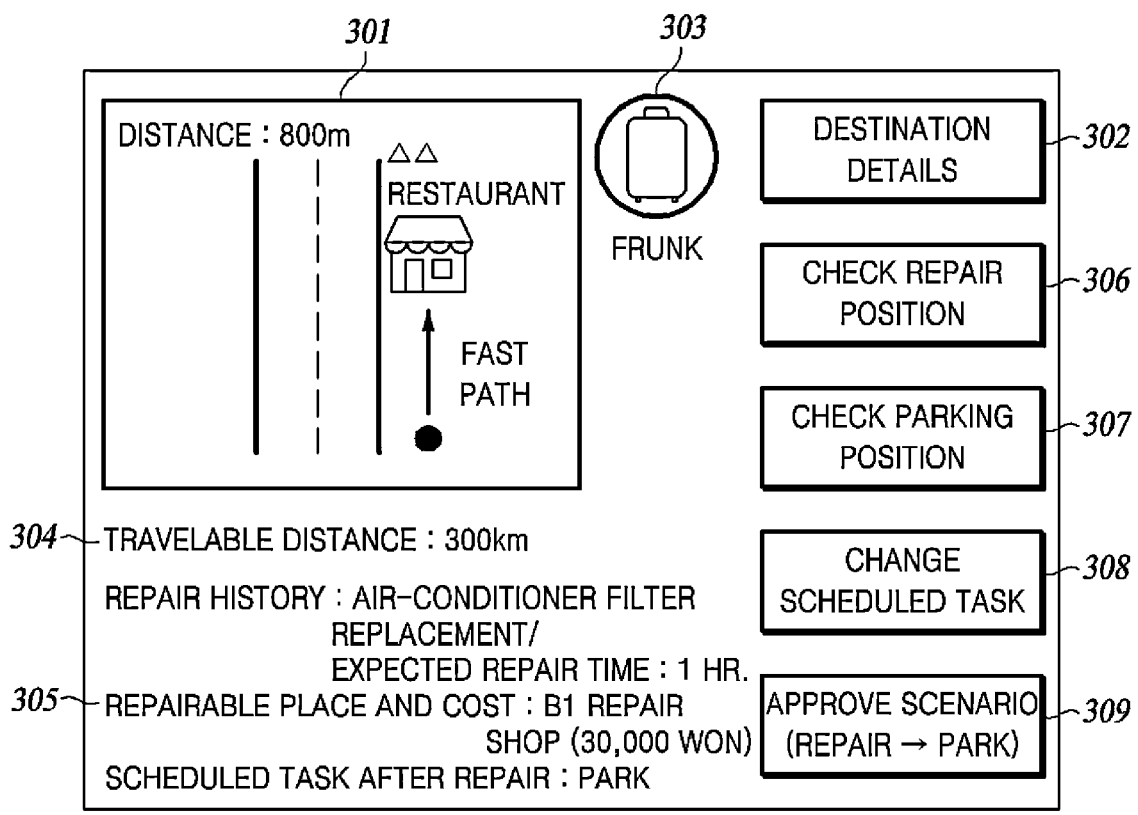
FIGS. 3A-3D are diagrams illustrating an example of a graphic user interface (GUI) displayed by an interface unit according to an embodiment of the present disclosure.

FIG. 3A shows an example of the GUI displayed by the first display unit 122 according to an embodiment of the present disclosure.

Referring to FIG. 3A, a first GUI 30 that is output to at least one area 200 and/or 220 inside the vehicle 10 may include graphic objects corresponding to various pieces of information. For instance, the controller 130 may control such that the first display unit 122 outputs the first GUI 30 before a preset time from time predicted to arrive at a position where a user exits.

The first GUI 30 may include a first graphic object 301 indicating a path from the position where the user exits to the destination and/or a second graphic object 302 for selectively outputting details about the destination. The first graphic object 301 may include a text and/or an image indicating a distance from the position where the user exits to the destination and/or expected arrival time. Here, the destination may be a recommended destination determined by the controller 130 or a destination based on a user's schedule. That is, the controller 130 may control the first display unit 122 to display the exiting guide information indicating the path from the position where the user exits to the destination. The controller 130 may control such that the first display unit 122 displays the user's reservation information, a menu sold at the destination, a grade of the destination, and/or other recommended destination lists, based on the detection of a user's input into at least one area of the second graphic object 302.

The first GUI 30 may include a third graphic object 303 indicating the presence of luggage in the vehicle and the position of the luggage. The third graphic object 303 may include a text and/or an image indicating the presence of the luggage and/or the position of the luggage. The controller 130 may control the first display unit 122 to display the exiting guide information indicating the presence of the luggage inside the vehicle and/or the position of the luggage.

The first GUI 30 may include a fourth graphic object 304 indicating a current state of the vehicle 10. The current state of the vehicle may include, for instance, a remaining battery level, a remaining fuel level, and/or a travelable distance. That is, the controller 130 may control the first display unit 122 to display management guide information indicating the current state of the vehicle 10.

The first GUI 30 may include a fifth graphic object 305 indicating the guide information on at least one management task among the management tasks included in the management scenario. The fifth graphic object 305 may include a text and/or an image indicating information on a first management task that is to be first performed among the management tasks included in the management scenario and information on a second management task that is to be performed after the first management task is completed. Here, the information on the first management task may include, for instance, a position at which the management task is to be performed, details of the management task, expected required time, and/or expected required cost.

The first GUI 30 may include one or more graphic objects 306 and 307 for selectively outputting a map image indicating a position at which at least one management task is to be performed. For example, the first GUI 30 may include a sixth graphic object 306 for selectively outputting the map image indicating a position at which the first management task is to be performed and a seventh graphic object 307 for selectively outputting the map image indicating a position at which the second management task is to be performed. The controller 130 may control so that the first display unit 122 outputs the map image indicating the position at which the first management task or the second management task is to be performed, based on the detection of the user's input into at least one area of the sixth graphic object 306 or the seventh graphic object 307.

The first GUI 30 may include an eighth graphic object 308 for receiving a request to change or add a management task included in the management scenario. The controller 130 may control such that the first display unit 122 outputs the GUI capable of changing or adding a management task that is to be performed, based on the detection of a user's input into at least one area of the eighth graphic object 308.

The first GUI 30 may include a ninth graphic object 309 for receiving approval for the management scenario. The ninth graphic object 309 may include a text and/or an image indicating management tasks and a sequence of the management tasks decided by the controller 130. The controller 130 may confirm that the user approved the management scenario, based on the detection of a user's input into at least one area of the ninth graphic object 309.

Although not shown in FIG. 3A, the first GUI 30 may further include a tenth graphic object for receiving disapproval for the management scenario. The controller 130 may confirm that the user disapproves of the management scenario, based on the detection of a user's input into at least one area of the tenth graphic object.

Figure 3B:
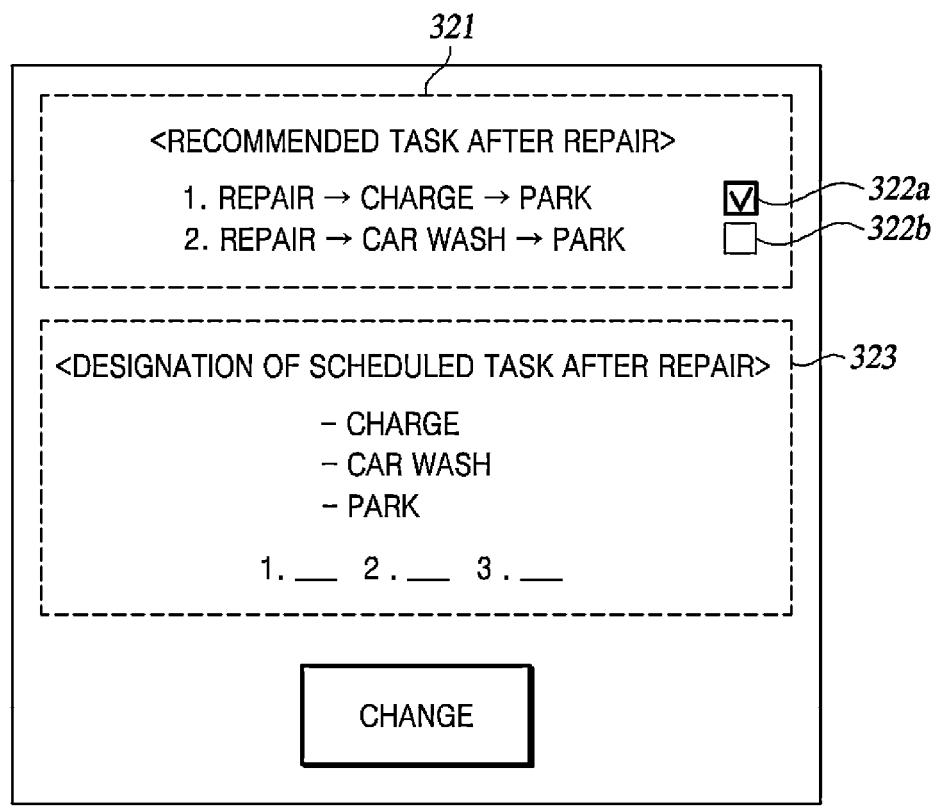

FIG. 3B shows an example of the GUI displayed by the first display unit 122 according to another embodiment of the present disclosure.

Referring to FIG. 3B, a second GUI 32 that is output to at least one area 200 and/or 220 inside the vehicle 10 may include graphic objects corresponding to various pieces of information. For instance, the controller 130 may control so that the first display unit 122 outputs the second GUI 32 when a user requests to change or add the maintenance task.

The second GUI 32 may include a first graphic object 321 indicating one or more recommended scenarios generated by the controller 130. The first graphic object 321 may include a text and/or an image indicating management tasks included in the recommended scenarios and a sequence of the management tasks. The first graphic object 321 may arrange and display the recommended scenarios according to a user's preference.

The second GUI 32 may include second graphic objects 322a and 322b for receiving the selection of any one of the recommended scenarios. The controller 130 may change the management scenario into the recommended scenario selected by the user, based on the detection of the user's input into at least one area of the second graphic objects 322a and 322b.

The second GUI 32 may include a third graphic object 323 for receiving one or more second management tasks that are to be performed after the first management task that is to be first performed after the user exits. The user may select one or more second management tasks through the third graphic object 323 and designate the sequence of the second management tasks. The controller 130 may add one or more second management tasks to a next turn of the first management task, based on the detection of the user's input into at least one area of the second graphic objects 322a and 322b.

Figure 3C:
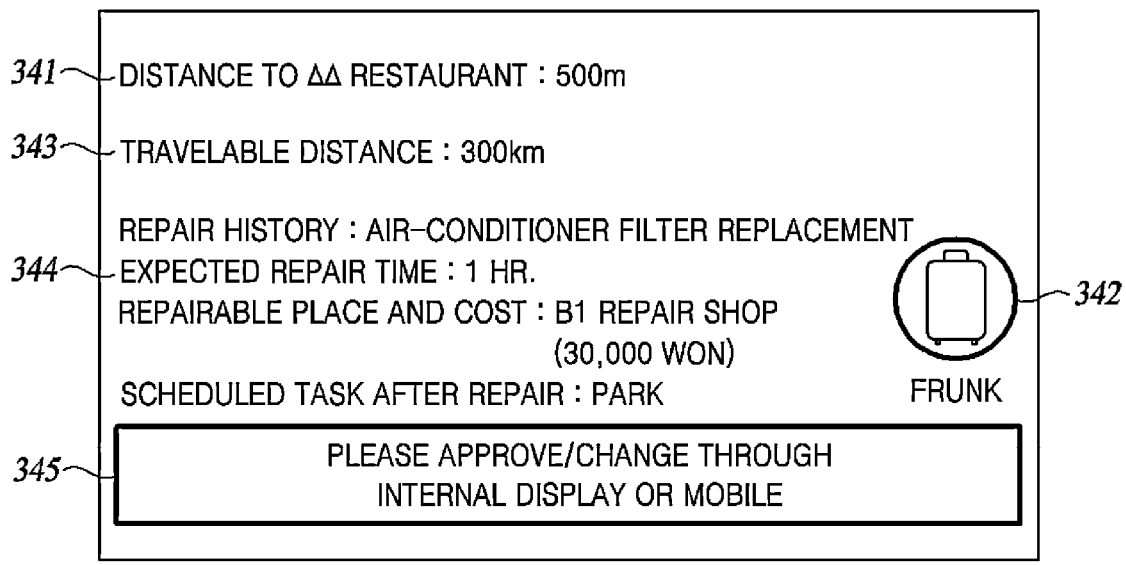

FIG. 3C shows an example of the GUI displayed by the second display unit 123 according to an embodiment of the present disclosure.

Referring to FIG. 3C, a third GUI 34 that is output to at least one area 240 on the exterior of the vehicle 10 may include graphic objects corresponding to various pieces of information. For instance, the controller 130 may control so that the second display unit 123 outputs the third GUI 34 in response to detecting that the door is opened.

The third GUI 34 may include a first graphic object 341 indicating information about the destination. Here, the destination may be a recommended destination determined by the controller 130 or a destination based on a user's schedule. The information about the destination may include a distance from the position where the user exits to the destination and/or expected arrival time. That is, the controller 130 may control the second display unit 123 to display the exiting guide information indicating the distance from the position where the user exits to the destination and/or the expected arrival time.

The third GUI 34 may include a second graphic object 342 indicating the presence of luggage in the vehicle and the position of the luggage. The second graphic object 342 may include a text and/or an image indicating the presence of the luggage and/or the position of the luggage. The controller 130 may control the second display unit 123 to display the exiting guide information indicating the presence of the luggage inside the vehicle and the position of the luggage.

The third GUI 34 may include a third graphic object 343 indicating a current state of the vehicle 10. The current state of the vehicle may include, for instance, a remaining battery level, a remaining fuel level, and/or a travelable distance. That is, the controller 130 may control the second display unit 123 to display management guide information indicating the current state of the vehicle 10.

The third GUI 34 may include a fourth graphic object 344 indicating the guide information on at least one management task among the management tasks included in the management scenario. The fourth graphic object 344 may include a text and/or an image indicating information on a first management task that is to be performed first among the management tasks included in the management scenario and information on a second management task that is to be performed after the first management task is completed. Here, the information on the first management task may include, for instance, a position at which the management task is to be performed, details of the management task, expected required time, and/or expected required cost.

The third GUI 34 may include a fifth graphic object 345 that guides the approval or change method of the management scenario. For instance, the fifth graphic object 345 may include a text and/or an image guiding that the management scenario may be approved or changed using the first display unit 122 or the user's terminal. The controller 130 may control so that the second display unit 123 outputs the fifth graphic object 345 when the user's approval is not completed.

When the user's approval is completed and the vehicle's door is switched to a locked state, the controller 130 may control so that the second display unit 123 outputs a text and/or an image indicating that a first management task in the management scenario is scheduled to be performed, instead of the fifth graphic object 345. For instance, the second display unit 123 may output a message, e.g., as text output, such as 'Moving to a repair shop soon. Have a good time.'

When a user disapproves, the controller 130 may control so that the second display unit 123, instead of the fifth graphic object 345, outputs a text and/or an image indicating that a parking task is scheduled to be performed. For instance, the second display unit 123 may output a message such as 'Proceeding to park. Have a good time.'

Figure 3D:
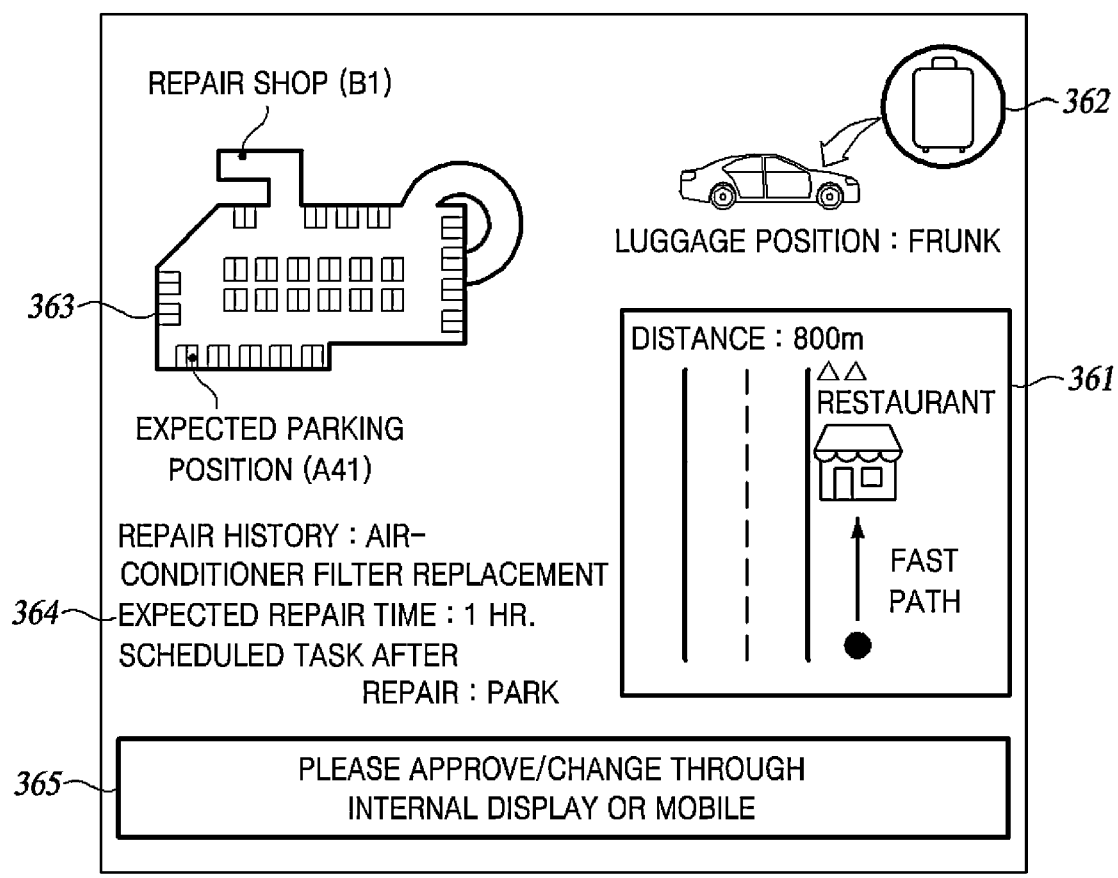

FIG. 3D shows an example of the GUI displayed by the second display unit 123 according to another embodiment of the present disclosure.

Referring to FIG. 3D, a fourth GUI 36 that is output to at least one area 260 on the ground may include graphic objects corresponding to various pieces of information. For instance, the controller 130 may control such that the second display unit 123 outputs the fourth GUI 36 in response to detecting that the door is opened.

The fourth GUI 36 may include a first graphic object 361 indicating a path from a position where the user exits to a destination. The first graphic object 361 may include a text and/or an image indicating a distance from the position where the user exits to the destination and/or expected arrival time. Here, the destination may be a recommended destination determined by the controller 130 or a destination based on a user's schedule. That is, the second display unit 123 may be controlled to display the exiting guide information indicating the path from the position where the user exits to the destination.

The fourth GUI 36 may include a second graphic object 362 indicating the presence of luggage in the vehicle and the position of the luggage. The second graphic object 362 may include a text and/or an image indicating the presence of the luggage and/or the position of the luggage. The controller 130 may control the second display unit 123 to display the exiting guide information indicating the presence of the luggage inside the vehicle and the position of the luggage.

The fourth GUI 36 may include a third graphic object 363 indicating positions where management tasks included in the management scenario are to be performed. The third graphic object 363 may be a map image indicating a position where at least one management task is to be performed.

The fourth GUI 36 may include a fourth graphic object 364 indicating the guide information on at least one management task among the management tasks included in the management scenario. The fourth graphic object 364 may include a text and/or an image indicating information on a first management task that is to be performed first among the management tasks included in the management scenario and information on a second management task that is to be performed after the first management task is completed. Here, the information on the first management task may include, for instance, details of the management task, expected required time, and/or expected required cost.

The fourth GUI 36 may include a fifth graphic object 365 that guides the approval or change method of the management scenario. For instance, the fifth graphic object 365 may include a text and/or an image guiding that the management scenario may be approved or changed using the first display unit 122 or the user's terminal. The controller 130 may control such that the second display unit 123 outputs the fifth graphic object 365 when the user's approval is not completed.

When the user's approval is completed and the vehicle's door is switched to a locked state, the controller 130 may control so that the second display unit 123, instead of the fifth graphic object 365, outputs a text and/or an image indicating that the approval is completed. For instance, the second display unit 123 may output a message such as 'Approval is completed. Have a good time.'

When a user disapproves, the controller 130 may control such that the second display unit 123, instead of the fifth graphic object 365, outputs a text and/or an image indicating that a parking task is scheduled to be performed. For instance, the second display unit 123 may output a message such as 'Proceeding to park. Have a good time.'

FIGS. 4A-4D are diagrams illustrating an example of the GUI displayed by the terminal according to an embodiment of the present disclosure.

FIGS. 4A-4D illustrate an example in which the controller 130 generates the management scenario in the order of the charging task and the parking task, but the present disclosure is not limited thereto.

Figure 4A:
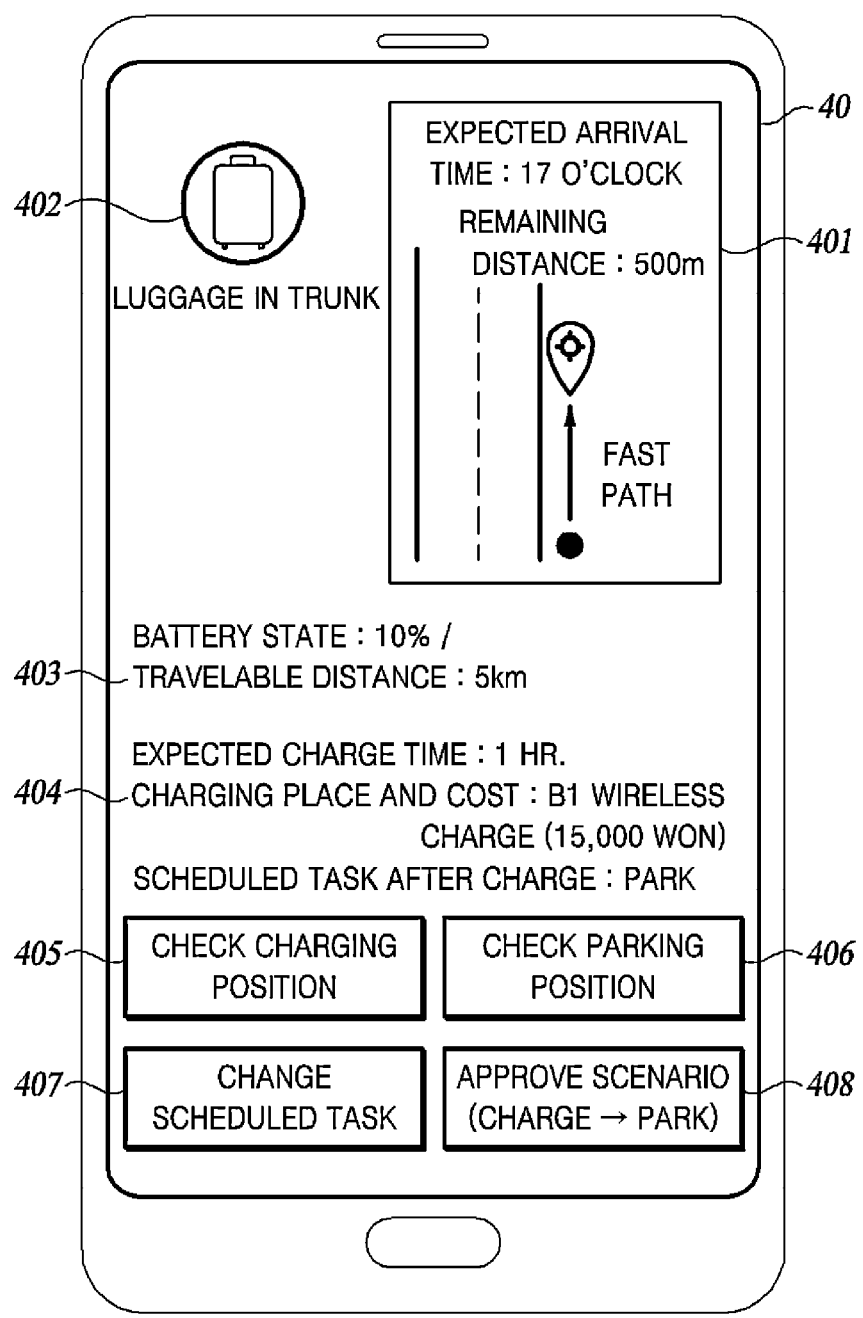
FIGS. 4A-4D are diagrams illustrating an example of a GUI displayed by a terminal according to an embodiment of the present disclosure.

FIG. 4A illustrates a fifth GUI 40 displayed by the user's terminal when the vehicle 10 is waiting for the approval for the management scenario.

Referring to FIG. 4A, the fifth GUI 40 may include graphic objects corresponding to various pieces of information. The controller 130 may transmit various pieces of information through the communication unit 126 to the terminal so that the terminal may output the fifth GUI 40. For example, when it is determined that the user has gotten off without responding to the approval request, the controller 130 may transmit the approval request through the communication unit 126 to the terminal.

The fifth GUI 40 may include a first graphic object 401 indicating the path from the position where the user exits to the destination. The first graphic object 401 may include a text and/or an image indicating a distance from a user's current position to the destination and/or expected arrival time. Here, the destination may be a recommended destination determined by the controller 130 or a destination based on a user's schedule. The controller 130 may transmit the exiting guide information indicating the path from the position where the user exits to the destination through the communication unit 126 to the terminal.

The fifth GUI 40 may include a second graphic object 402 indicating the presence of the luggage inside the vehicle and the position of the luggage. The second graphic object 402 may include a text and/or an image indicating the presence of the luggage and/or the position of the luggage. The controller 130 may transmit the exiting guide information indicating the presence of the luggage inside the vehicle and the position of the luggage through the communication unit 126 to the terminal.

The fifth GUI 40 may include a third graphic object 403 indicating the current state of the vehicle 10. The current state of the vehicle may include, for instance, a remaining battery level, a remaining fuel level, and/or a travelable distance. The controller 130 may transmit management guide information indicating the current state of the vehicle 10 through the communication unit 126 to the terminal.

The fifth GUI 40 may include a fourth graphic object 404 indicating the guide information on at least one management task among the management tasks included in the management scenario. The fourth graphic object 404 may include a text and/or an image indicating information on a first management task that is to be performed first among the management tasks included in the management scenario and information on a second management task that is to be performed after the first management task is completed. Here, the information on the first management task may include, for instance, a position at which the management task is to be performed, details of the management task, expected required time, and/or expected required cost. The controller 130 may transmit the guide information on at least one management task among the management tasks included in the management scenario through the communication unit 126 to the terminal.

The fifth GUI 40 may include one or more graphic objects 405 and 406 for selectively outputting a map image indicating a position at which at least one management task is to be performed. For example, the fifth GUI 40 may include a fifth graphic object 405 for selectively outputting the map image indicating a position at which the first management task is to be performed and a sixth graphic object 406 for selectively outputting the map image indicating a position at which the second management task is to be performed. The first display unit 122 may output the map image indicating the position at which the first management task or the second management task is to be performed, based on the detection of the user's input into at least one area of the sixth graphic object 406 or the seventh graphic object 407 through the terminal.

The fifth GUI 40 may include the seventh graphic object 407 for receiving a request to change or add the management task included in the management scenario. The terminal may output the GUI capable of changing or adding a scheduled management task on a screen, based on the detection of the user's input into at least one area of the seventh graphic object 407. Here, the GUI capable of changing or adding the scheduled management task may be, for instance, the same as or similar to the second GUI 32 of FIG. 3B, but the present disclosure is not limited thereto. When the user's change or addition is completed, the terminal may transmit information on the changed management scenario to the vehicle 10. That is, the controller 130 may acquire information about the changed management scenario from the terminal through the communication unit 126.

The fifth GUI 40 may include an eighth graphic object 408 for receiving approval for the management scenario. The eighth graphic object 408 may include a text and/or an image indicating management tasks and a sequence of the management tasks decided by the controller 130. The controller 130 may transmit the management tasks included in the management scenario and a sequence of the management tasks through the communication unit 126 to the terminal along with the approval request. The terminal may transmit a signal indicating that the user approved the management scenario to the vehicle 10, in response to the detection of the user's input into at least one area of the eighth graphic object 408. That is, the controller 130 may acquire an approval command for the management scenario from the terminal through the communication unit 126.

Although not shown in FIG. 4A, the fifth GUI 40 may further include a ninth graphic object for receiving disapproval for the management scenario. The terminal may transmit a signal indicating that the user disapproves of the management scenario to the vehicle 10, in response to the detection of the user's input into at least one area of the tenth graphic object. That is, the controller 130 may acquire a disapproval command for the management scenario from the terminal through the communication unit 126.

Figure 4B:
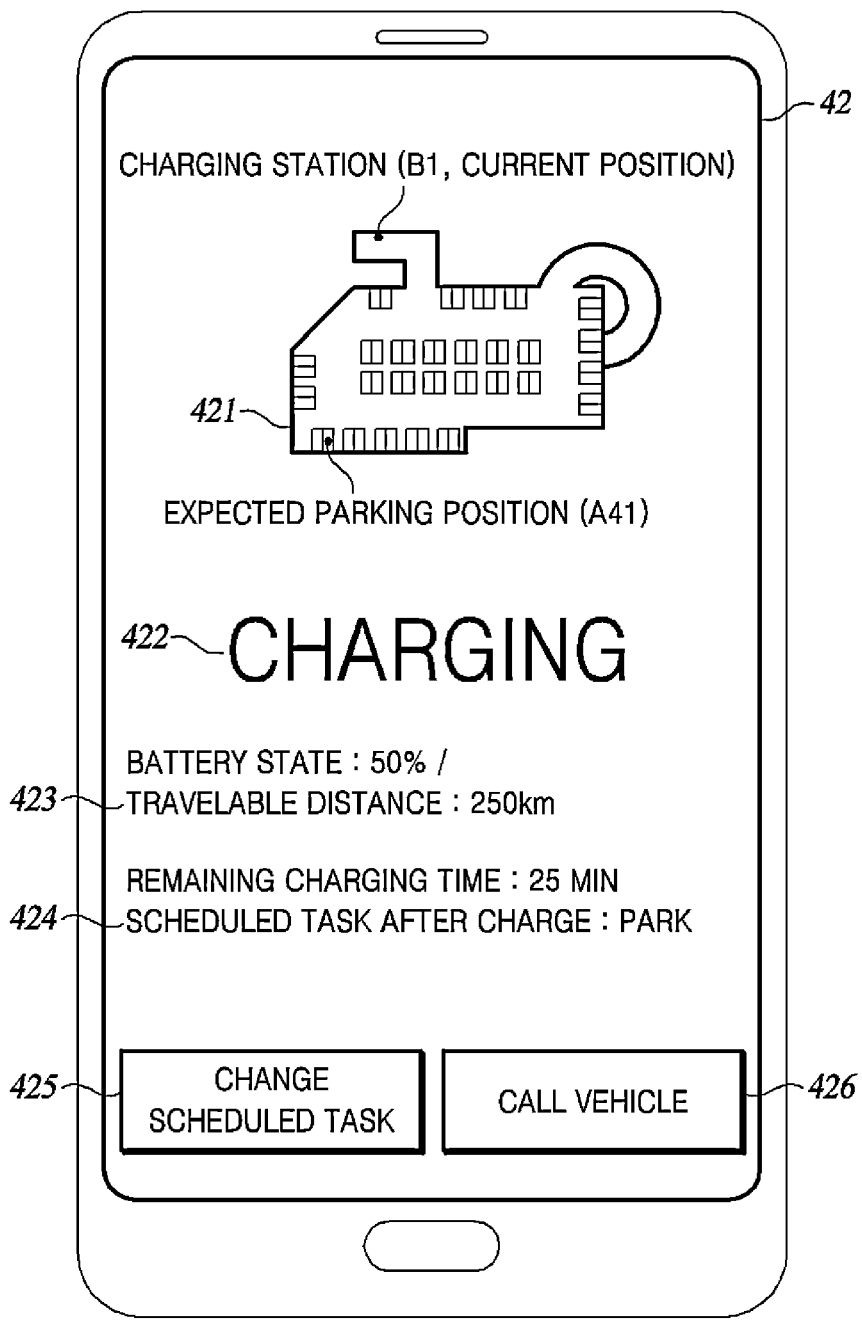

FIG. 4B illustrates a sixth GUI 42 displayed by the user's terminal when the vehicle 10 is performing the management task in the management scenario.

Referring to FIG. 4B, the sixth GUI 42 may include graphic objects corresponding to various pieces of information. The controller 130 may transmit various pieces of information through the communication unit 126 to the terminal so that the terminal may output the sixth GUI 42. For example, the controller 130 may transmit a signal indicating the start of a specific management task in the management scenario to the terminal.

The sixth GUI 42 may include a first graphic object 421 indicating positions where the management tasks included in the management scenario are performed. For instance, the first graphic object 421 may be a map image indicating a position corresponding to a task that is currently being performed (i.e., a current position of the vehicle 10) and a position corresponding to a management task that is subsequently performed. The controller 130 may transmit information that may identify the management task currently being performed and the positions where the management tasks are performed, through the communication unit 126 to the terminal.

The sixth GUI 42 may include a second graphic object 422 indicating the task that is currently being performed by the vehicle 10. The controller 130 may transmit the information that may identify the management task that is currently being performed, through the communication unit 126 to the terminal.

The sixth GUI 42 may include a third graphic object 403 indicating the current state of the vehicle 10. The current state of the vehicle may include, for instance, a remaining battery level, a remaining fuel level, and/or a travelable distance. The controller 130 may transmit the current state of the vehicle 10 through the communication unit 126 to the terminal. The sixth GUI 42 may include a fourth graphic object 424 indicating the guide information on at least one management task among the management tasks included in the management scenario. The fourth graphic object 424 may include a text and/or an image indicating information on a first management task that is currently being performed among the management tasks included in the management scenario and information on a second management task that is to be performed after the first management task is completed. Here, the information on the first management task may include, for instance, details of the management task and/or expected remaining time. The controller 130 may transmit the guide information on at least one management task among the management tasks included in the management scenario through the communication unit 126 to the terminal.

The sixth GUI 42 may include a fifth graphic object 425 for receiving a request to change or add the second management task that is to be performed after the first management task that is currently being performed. The terminal may output the GUI capable of changing or adding a scheduled management task to a screen, based on the detection of the user's input into at least one area of the fifth graphic object 425. Here, the GUI capable of changing or adding the scheduled management task may be, for instance, the same as or similar to the second GUI 32 of FIG. 3B, but the present disclosure is not limited thereto. When the user's change or addition is completed, the terminal may transmit information on the changed management scenario to the vehicle 10. That is, the controller 130 may acquire information about the changed management scenario from the terminal through the communication unit 126.

The sixth GUI 42 may include a sixth graphic object 426 for calling the vehicle 10. The terminal may transmit a call command to the vehicle 10, based on the detection of the user's input into at least one area of the sixth graphic object 426. The terminal may transmit a user's current position and/or a pickup position set by the user to the vehicle 10 along with the call command That is, the controller 130 may acquire the call command, the user's current position, and/or the pickup position from the terminal through the communication unit 126. According to embodiments, the vehicle 10 may stop the management task and move to the user's current position or the pickup position as soon as the vehicle obtains the call command, or the vehicle may move to the user's current position or the pickup position after completing a task that is being currently performed.

Figure 4C:
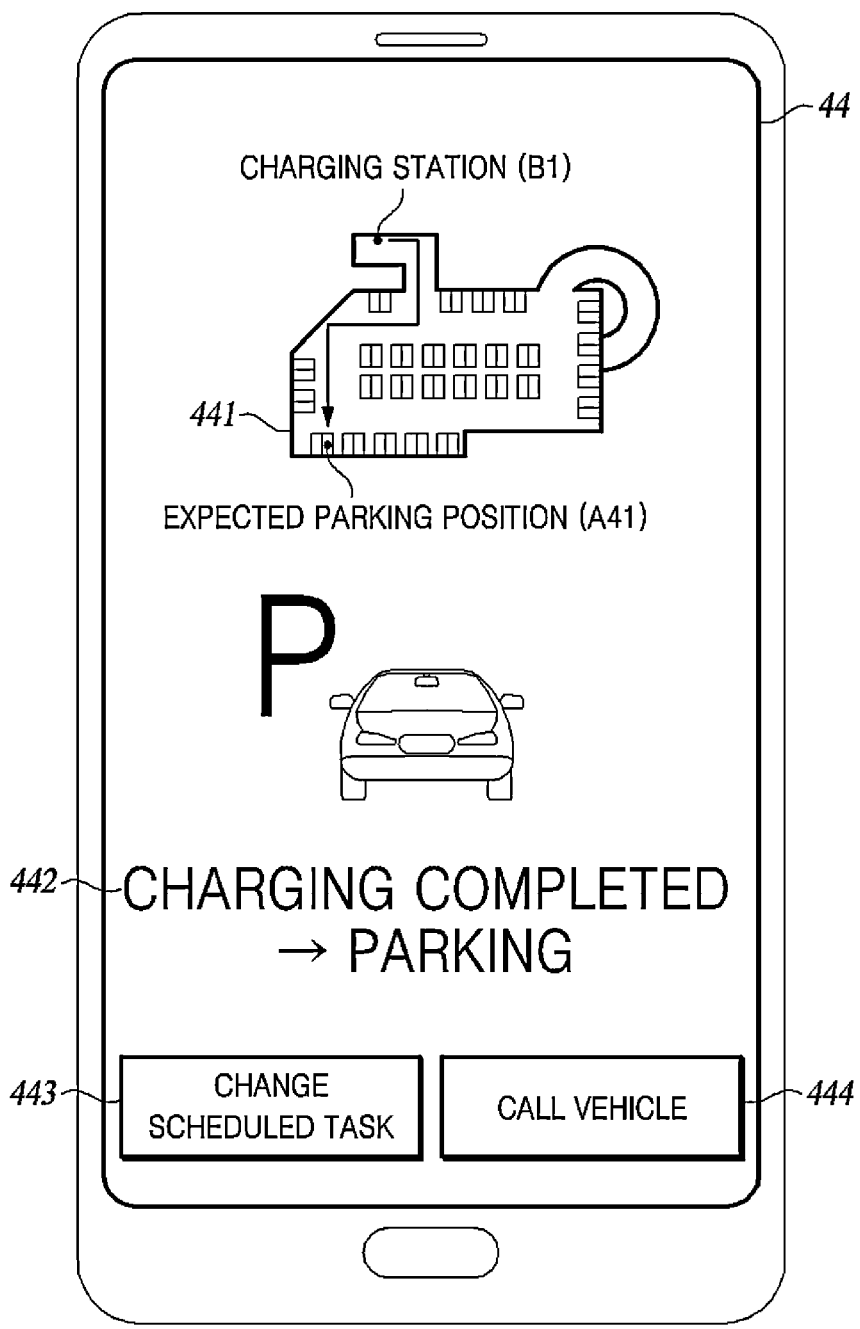

FIG. 4C illustrates a seventh GUI 44 displayed by the user's terminal when the vehicle 10 completes a first management task and is moving to perform a second management task.

Referring to FIG. 4C, the seventh GUI 44 may include graphic objects corresponding to various pieces of information. The controller 130 may transmit various pieces of information through the communication unit 126 to the terminal so that the terminal may output the seventh GUI 44. For example, the controller 130 may transmit a signal indicating the end of the first management task and the start of the second management task to the terminal.

The seventh GUI 44 may include a first graphic object 441 indicating positions where the management tasks included in the management scenario are performed. For instance, the first graphic object 441 may be a map image indicating a position corresponding to the first management task, a position corresponding to the second management task, a current position of the vehicle 10, and/or a path from the position corresponding to the first management task to the position corresponding to the second management task. The controller 130 may transmit the positions where the management tasks are performed, the path between the positions, and/or the current position of the vehicle 10 through the communication unit 126 to the terminal.

The seventh GUI 44 may include a second graphic object 442 indicating the first management task that is completed by the vehicle 10 and the second management task that is to be performed. The controller 130 may transmit the information that may identify the management task that is currently being performed, through the communication unit 126 to the terminal.

The seventh GUI 44 may include a third graphic object 443 for receiving a request to change or add the second management task. The terminal may output the GUI that may change the second management task or may change or add the management task that is to be performed after the second management task to a screen, based on the detection of the user's input into at least one area of the third graphic object 443. Here, the GUI capable of changing or adding the management task may be, for instance, the same as or similar to the second GUI 32 of FIG. 3B, but the present disclosure is not limited thereto. When the user's change or addition is completed, the terminal may transmit information on the changed management scenario to the vehicle 10. That is, the controller 130 may acquire information about the changed management scenario from the terminal through the communication unit 126.

The seventh GUI 44 may include a fourth graphic object 444 for calling the vehicle 10. The terminal may transmit a call command to the vehicle 10, based on the detection of the user's input into at least one area of the fourth graphic object 444. The terminal may transmit a user's current position and/or a pickup position set by the user to the vehicle 10 along with the call command That is, the controller 130 may acquire the call command, the user's current position, and/or the pickup position from the terminal through the communication unit 126.

Figure 4D:
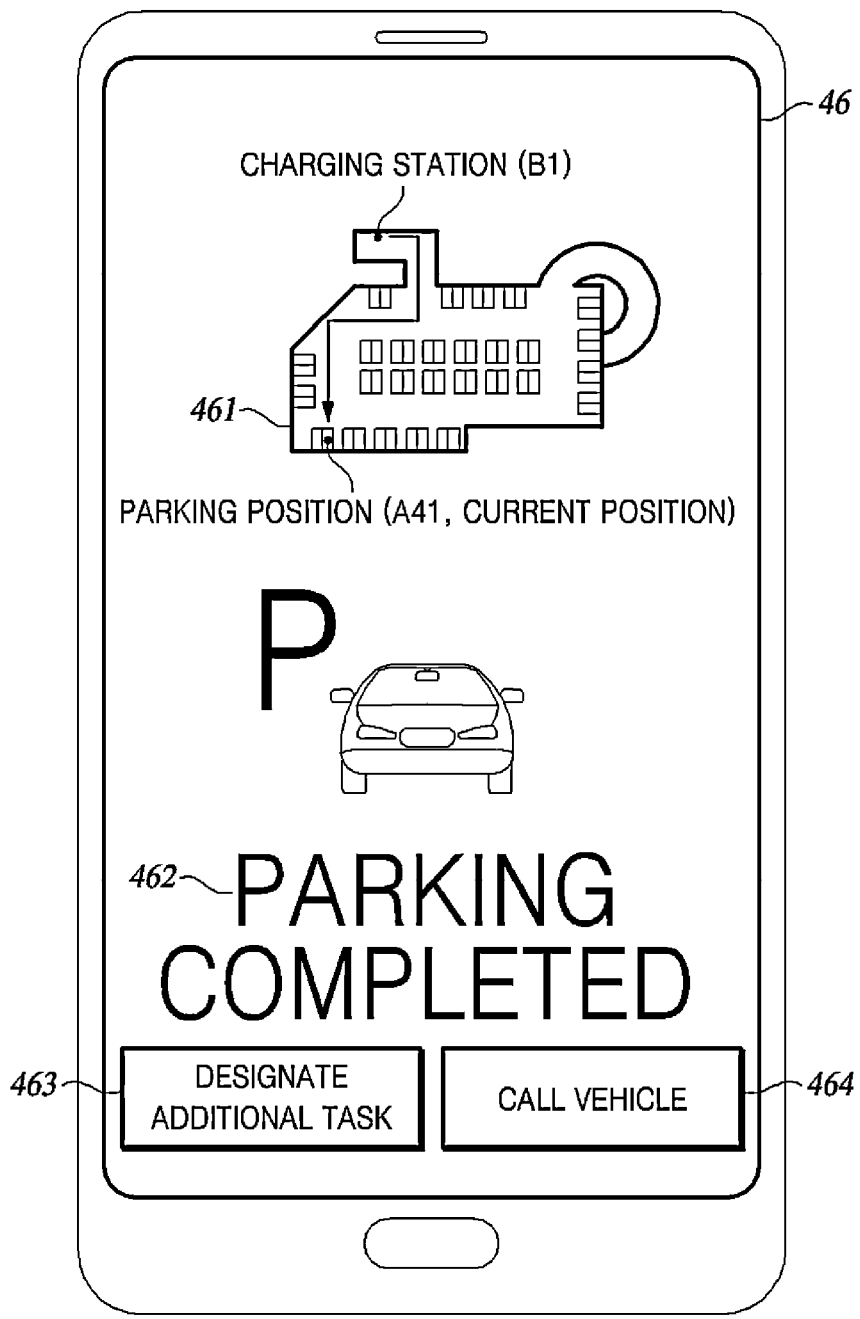

FIG. 4D illustrates an eighth GUI 46 displayed by the user's terminal when the vehicle 10 completes all management tasks in the management scenario.

Referring to FIG. 4D, the eighth GUI 46 may include graphic objects corresponding to various pieces of information. The controller 130 may transmit various pieces of information through the communication unit 126 to the terminal so that the terminal may output the eighth GUI 46. For example, the controller 130 may transmit a signal indicating the end of all the management tasks to the terminal.

The eighth GUI 46 may include a first graphic object 461 indicating positions where the management tasks included in the management scenario are performed. For instance, the first graphic object 461 may be a map image indicating a position corresponding to each management task. The controller 130 may transmit the positions where the management tasks are performed through the communication unit 126 to the terminal.

The eighth GUI 46 may include a second graphic object 462 indicating that the management task is completed. The second graphic object 462 may, for instance, include a text and/or an image indicating that a last management task is completed. The controller 130 may transmit a signal indicating the end of the management task, through the communication unit 126 to the terminal.

The eighth GUI 46 may include a third graphic object 463 for receiving a request to add the management task. The terminal may output the GUI capable of designating a management task that is to be additionally performed to a screen, based on the detection of the user's input into at least one area of the third graphic object 463. When the user's additional management task has been designated, the terminal may transmit information on the added management tasks to the vehicle 10. That is, the controller 130 may acquire information about the changed management scenario from the terminal through the communication unit 126. The vehicle 10 may move to a current position or a new parking position after performing the added management tasks.

The eighth GUI 46 may include a fourth graphic object 464 for calling the vehicle 10. The terminal may transmit a call command to the vehicle 10, based on the detection of the user's input into at least one area of the fourth graphic object 464. The terminal may transmit a user's current position and/or a pickup position set by the user to the vehicle 10 along with the call command That is, the controller 130 may acquire the call command, the user's current position, and/or the pickup position from the terminal through the communication unit 126.

Figure 5A:
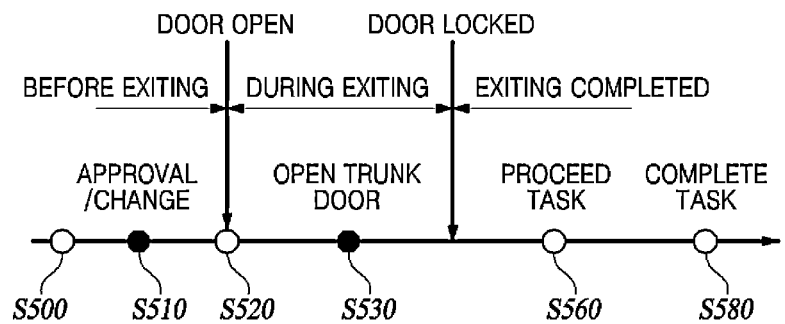
FIGS. 5A-5C are diagrams illustrating the time at which an interface unit provides information according to an embodiment of the present disclosure.
Figure 5B:
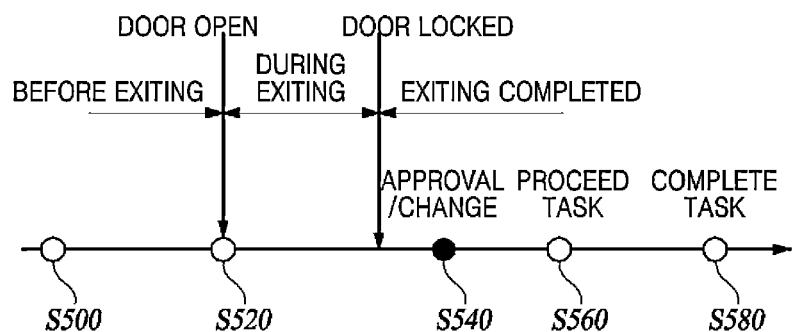
Figure 5C:
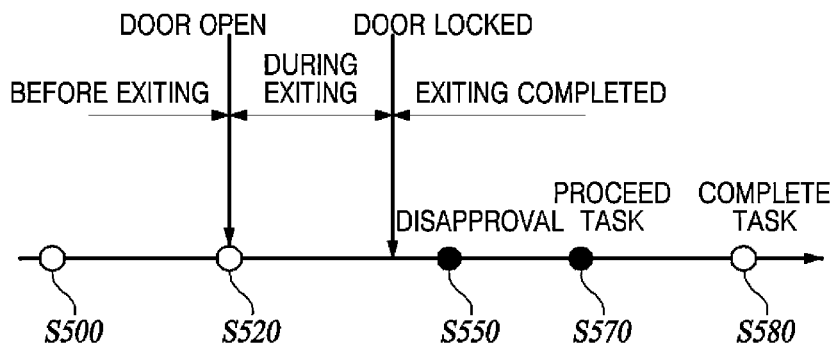

FIGS. 5A-5C are diagrams illustrating the time at which the interface unit provides information according to an embodiment of the present disclosure.

FIG. 5A shows a case in which approval or change for the management scenario is completed before a user exits the vehicle.

A preset amount of time before the time the vehicle 10 is expected to arrive at a position where the user exits, the controller 130 may output a request of approval for the management scenario, management guide information, and/or exiting guide information using the interface unit 120 (S500). For example, the controller 130 may control so that the first display unit 122 outputs the GUI as shown in FIG. 3A. Furthermore, the controller 130 may control such that the first sound output unit 124 outputs sound indicating the request of approval for the management scenario. Furthermore, the controller 130 may transmit the request of approval for the management scenario and various pieces of guide information through the communication unit 126 to the terminal, according to the internal/external situation of the vehicle 10. Thus, the terminal may output the GUI as shown in FIG. 4A.

When the user completes the approval or change for the management scenario, the controller 130 may output information indicating that approval for the management scenario is completed, management guide information, and/or the exiting guide information using the interface unit 120 (S510).

When at least one first door is detected to be opened, the controller 130 may output various pieces of information using the second display unit 123 and/or the second sound output unit 125 (S520). For example, the controller 130 may control such that the second display unit 123 outputs the GUI shown in FIG. 3C to at least one area on the exterior of the vehicle 10, and outputs the GUI shown in FIG. 3D to at least one area on the ground. According to embodiments, the controller 130 may control so that the second display unit 123 outputs information indicating that the approval for the management scenario is completed, instead of information guiding the approval or change method of the management scenario. For example, the controller 130 may control so that the second display unit 123 outputs a text such as 'After exiting, move to [place name]. Have a good time.' to at least one area on the exterior of the vehicle 10, and outputs a text such as 'Approval is completed. Have a good time.' to at least one area on the ground. When the opening of the first door is detected or when the closing or locking of the first door is detected thereafter, the controller 130 may control so that the first display unit 122 and the first sound output unit 124 do not output information.

When the trunk door is detected to be opened, the controller 130 may output information indicating that the approval for the management scenario is completed, information indicating a management task that is to be performed first in the management scenario, and various pieces of guide information, using the first display unit 122 and/or the first sound output unit 124 (S530). For example, the controller 130 may control so that the first display unit 122 outputs information to the visible area of the second row. Thus, a user who is outside the vehicle 10 may check various pieces of guide information through the first display unit 122 inside the vehicle 10. Subsequently, when it is detected that the trunk door is closed or locked, the controller 130 may control so that the first display unit 122 and the first sound output unit 124 do not output information.

When the management task is started, the controller 130 may transmit information corresponding to the progress of the management task to the terminal using the communication unit 126 (S560). The terminal may output the GUI as shown in FIGS. 4B and 4C, for instance. Thus, the user may change or add a scheduled management task or may call the vehicle 10.

When all management tasks have ended, the controller 130 may transmit information indicating the end of the management tasks to the terminal using the communication unit 126 (S580). The terminal may output the GUI as shown in FIG. 4D, for instance. Thus, the user may designate the additional management task or call the vehicle 10 using the terminal.

FIG. 5B shows a case in which approval or change for the management scenario is completed after a user exits the vehicle. In the description of FIG. 5B, the detailed description of portions overlapping with those of FIG. 5A is omitted.

When it is detected that at least one first door is opened while the user has not responded to the request for the approval, the controller 130 may transmit the approval request to the terminal using the communication unit 126 and may output various pieces of information using the second display unit 123 and/or the second sound output unit 125 (S520). For example, the terminal may output the GUI as shown in FIG. 4A and the second display unit 123 may output the GUI as shown in FIG. 3C to at least one area on the exterior of the vehicle 10 and may output the GUI as shown in FIG. 3D to at least one area on the ground. Thus, the user may check the approval or change method of the management scenario and various pieces of guide information and may approve or change the management scenario through the terminal.

When the user completes the approval or change for the management scenario, the controller 130 may output information indicating that the approval for the management scenario is completed, using the interface unit 120 (S540). For example, the controller 130 may control so that the second display unit 123 outputs a message such as 'Moving to [place name] soon. Have a good time' to at least one area on the exterior of the vehicle 10, and outputs a message such as 'Approval is completed. Have a good time' in at least one area of the ground.

FIG. 5C shows a case in which the management scenario is disapproved after a user exits the vehicle. In the description of FIG. 5C, the detailed description of portions overlapping with those of FIG. 5A and/or FIG. 5B is omitted.

When the user disapproves of the management scenario, the controller 130 may output information indicating that the parking task is scheduled to be performed using the interface unit 120 (S550). For example, the controller 130 may control so that the second display unit 123 outputs a text such as 'Parking will begin soon. Have a good time' to at least one area of each of the exterior of the vehicle 10 and the ground. When the user inputs a disapproval command or an approval command is not input within a preset time after the user has gotten off, the controller 130 may determine that the user disapproves of the management scenario.

When the vehicle 10 starts to move to an intended parking position, the controller 130 may transmit information corresponding to the progress of the parking task to the terminal using the communication unit 126 (S570). The terminal may output a screen including, for instance, an intended parking position, a current position of the vehicle 10, and a moving path. The user may add a management task that is to be performed before parking or may call the vehicle 10 through the terminal.

Figure 6:
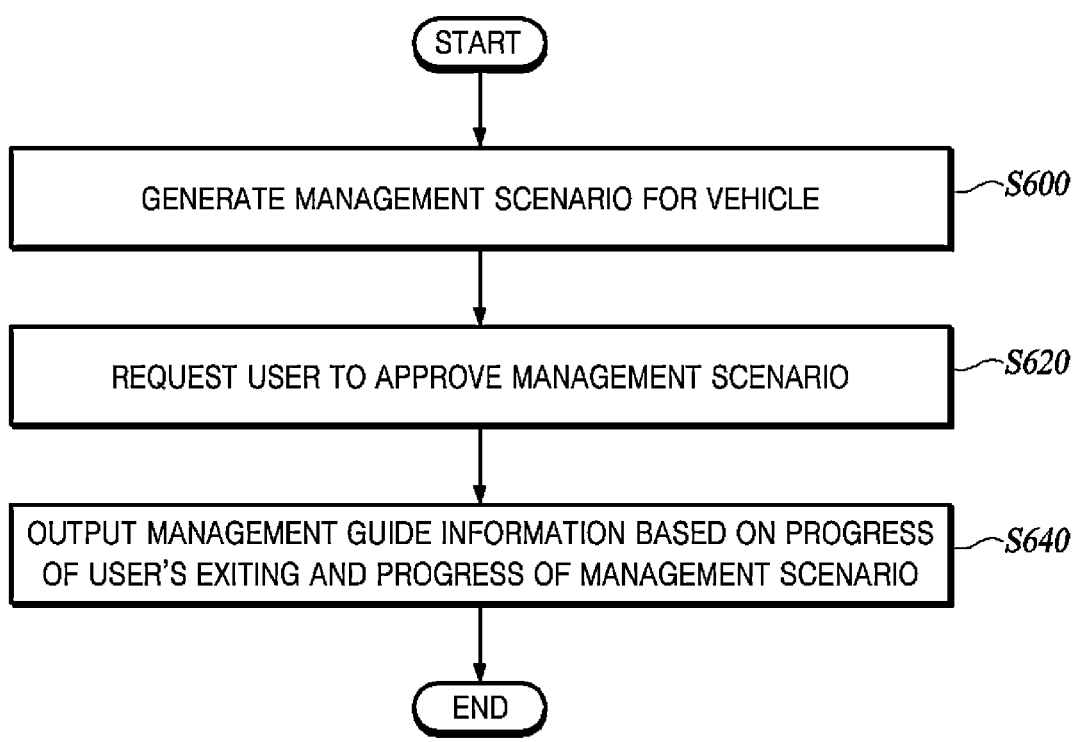
FIG. 6 is a flowchart illustrating a method of providing information according to an embodiment of the present disclosure.

FIG. 6 is a flowchart illustrating a method of providing information according to an embodiment of the present disclosure.

Since the method shown in FIGS. 6-8 may be performed by the above-described guide apparatus or the vehicle 10 equipped with the guide apparatus (hereinafter referred to as an electronic apparatus), a duplicated description thereof has been omitted herein.

The electronic apparatus may generate a management scenario for the vehicle 10 (S600).

In an embodiment, the electronic apparatus may decide one or more management tasks that are to be performed after the user exits, and a sequence of the management tasks. Here, the management tasks may include one or more of the charging task, the repairing task, the car washing task, and the parking task.

In another embodiment, the electronic apparatus may decide at least one first management task that is to be performed after the user exits and may decide at least one second management task that is to be performed after or before the first management task, based on setting information input by the user or a user's management preference information. Here, the electronic apparatus may generate one or more recommended scenarios including the first management task and at least one second management task and may receive the selection for any one of one or more recommended scenarios from the user.

The electronic apparatus may request the user to approve the management scenario (S620). As one example, the electronic apparatus may output the approval request for the management scenario before the user arrives at a position where the user exits and may transmit the approval request to the user's terminal when the user exits without responding to the approval request. Here, the electronic apparatus may output and/or transmit a selection request for any one of one or more recommended scenarios together with the approval request for the management scenario.

The electronic apparatus may output management guide information based on the progress of the user's exiting and the progress of the user's management scenario (S640). The electronic apparatus may determine the progress of the user's exiting, based on the position in which the user is detected inside or outside the vehicle 10 and the door state of the vehicle 10. Here, the exiting progress may be determined as any one of a state before exiting, a state during exiting, and a state where exiting is completed. The progress of the management scenario may include the progress for the approval request of the management scenario and/or the progress for performing the management task in the management scenario.

The electronic apparatus may decide the method of outputting the management guide information, based on the user's exiting progress. Here, the method of outputting the management guide information may be determined by the combination of one or more of a first method of visually outputting the management guide information to at least one area inside the vehicle 10, a second method of visually outputting the management guide information to at least one area outside the vehicle 10, a third method of audibly outputting the management guide information to the inside of the vehicle, a fourth method of audibly outputting the management guide information to the outside of the vehicle, and a fifth method of transmitting the management guide information to the user's terminal. Here, at least one area inside the vehicle 10 corresponding to the first method and at least one area outside the vehicle 10 corresponding to the second method may be decided based on the position where the user is detected inside or outside the vehicle and the door state of the vehicle 10.

The management guide information may include, for instance, a position corresponding to at least one management task among the management tasks included in the management scenario, the expected required time, and the expected required cost of at least one management task. As another example, the management guide information may include information on the first management task that is any one of the management tasks included in the management scenario, and information on the second management task in an order adjacent to the first management task. Here, the first management task may be the management task that is currently being performed by the vehicle 10 or the management task that is to be first performed by the vehicle 10 after the current time. Information about the second management task may be information indicating that the second management task is completed before the first management task or information indicating that the second management task is scheduled to be performed after the first management task.

The electronic apparatus may output personalized exiting guide information as well as the management guide information to the user. As one example, the electronic apparatus may decide the recommended destination among POIs within a preset distance from the position where the user exits and may output the exiting guide information guiding the path from the position where the user exits to the recommended destination, along with the management guide information. As another example, the electronic apparatus may output the exiting guide information indicating the presence of luggage in the vehicle and the position of the luggage, along with the management guide information.

Figure 7:
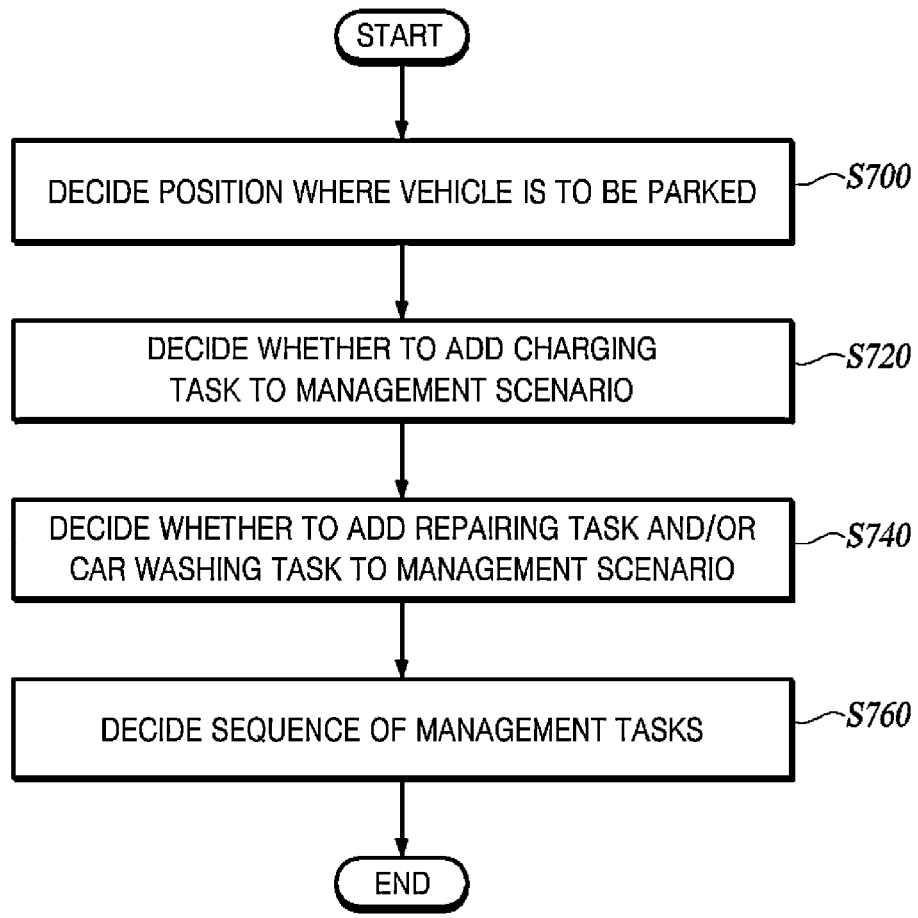
FIG. 7 is a flowchart illustrating a management scenario generation method according to an embodiment of the present disclosure.

FIG. 7 is a flowchart illustrating a management scenario generation method according to an embodiment of the present disclosure.

The electronic apparatus may decide a position where the vehicle 10 is to be parked (S700).

The electronic apparatus may decide whether to add the charging task to the management scenario (S720). For instance, the electronic apparatus may decide whether to include the charging task in the management scenario, based on whether a difference between the travelable distance of the vehicle 10 and the required travel distance is within a preset threshold.

The electronic apparatus may decide whether to add the repairing task and/or the car washing task to the management scenario (S740). For instance, the electronic apparatus may acquire management history information for at least one management task among the repairing task and the car washing task, acquire information on the management facility near a position where the vehicle 10 is to be parked for each management task, and decide whether to include each management task in the management scenario, based on the management history information and the management facility information.

The electronic apparatus may decide a sequence between the management tasks added to the management scenario (S760).

Figure 8:
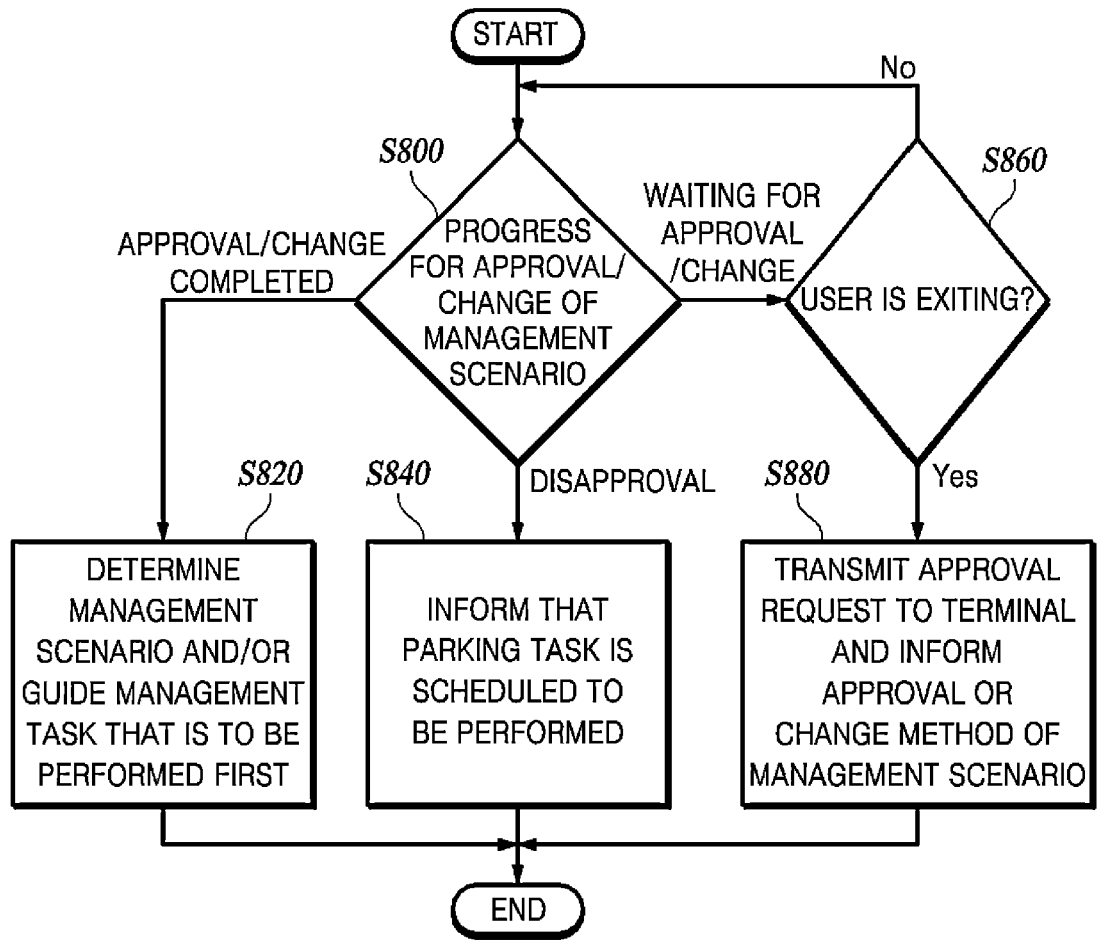
FIG. 8 is a flowchart illustrating a guide method according to an embodiment of the present disclosure.

FIG. 8 is a flowchart illustrating a guide method according to an embodiment of the present disclosure.

The electronic apparatus may monitor the progress for the approval or change of the management scenario (S800).

When the approval or change of the management scenario is completed, the electronic apparatus may determine the management scenario and guide the management task that is to be performed first by the user (S820). As one example, when it is determined that the user has gotten off having approved or changed the management scenario, the electronic apparatus may output, a graphic object indicating that the management scenario is approved and a graphic object indicating the management task that is to be performed first in the management scenario, to at least one area outside the vehicle.

When approval of the management scenario is disapproved, the electronic apparatus may inform the user that the vehicle 10 is scheduled to perform the parking task (S840). As one example, when it is determined that the user has gotten off having disapproved of the management scenario, the electronic apparatus may output a graphic object indicating that the parking task is scheduled to be performed in at least one area outside the vehicle.

When the vehicle is waiting for the approval or change for the management scenario, the electronic apparatus may check whether the user is exiting (S860).

When the user is exiting, the electronic apparatus may transmit the approval request to the terminal and inform the user of the approval or change method of the management scenario (S880). As one example, when it is determined that the user exits without responding to the approval request, the electronic apparatus may output, the graphic object guiding that it is possible to respond to the approval request using the terminal, to at least one area outside the vehicle.

According to an embodiment of the present disclosure, it is possible to determine a management task required for a vehicle and provide related information to a user, thus increasing convenience for vehicle management.

According to an embodiment of the present disclosure, it is possible to provide personalized information to a user exiting a vehicle.

According to an embodiment of the present disclosure, it is possible to determine the time and method of providing information about a management task based on a user's exiting progress and the progress of a management scenario to the user, thus effectively delivering the information about the management task to the user.

Effects of the present disclosure are not limited to the above-mentioned effects, and other effects which are not mentioned should be clearly understood by those having ordinary skill in the art from the following description.

Each component of the apparatus or method according to the present disclosure may be implemented as hardware or software, or a combination of hardware and software. Furthermore, the function of each component may be implemented as software and a microprocessor may be implemented to execute the function of software corresponding to each component.

Various implementations of systems and techniques described herein may be realized as digital electronic circuits, integrated circuits, field programmable gate arrays (FPGAs), application-specific integrated circuits (ASICs), computer hardware, firmware, software, and/or combinations thereof. These various implementations may include one or more computer programs executable on a programmable system. The programmable system includes at least one programmable processor (which may be a special-purpose processor or a general-purpose processor) coupled to receive and transmit data and instructions from and to a storage system, at least one input device, and at least one output device. The computer programs (also known as programs, software, software applications, or codes) contain commands for a programmable processor and are stored in a "computer-readable recording medium".

The computer-readable recording medium includes all types of recording devices in which data readable by a computer system is stored. Such a computer-readable recording medium may be a non-volatile or non-transitory medium, such as a read-only memory (ROM), compact disk ROM (CD-ROM), magnetic tape, floppy disk, memory card, hard disk, magneto-optical disk, or storage device, and may further include a transitory medium such as a data transmission medium. In addition, the computer-readable recording medium may be distributed in a computer system connected via a network, so that computer-readable codes may be stored and executed in a distributed manner.

The flowchart/timing diagram of the present specification describes that processes are sequentially executed, but this is merely illustrative of the technical idea of an embodiment of the present disclosure. In other words, since it is apparent to those having ordinary skill in the art that an order described in the flowchart/timing diagram may be changed or one or more processes may be executed in parallel without departing from the essential characteristics of an embodiment of the present disclosure, the flowchart/timing diagram is not limited to a time-series order.

Although exemplary embodiments of the present disclosure have been described for illustrative purposes, those having ordinary skill in the art should appreciate that various modifications, additions, and substitutions are possible, without departing from the idea and scope of the claimed disclosure. Therefore, exemplary embodiments of the present disclosure have been described for the sake of brevity and clarity. The scope of the technical idea of the present embodiments is not limited by the illustrations. Accordingly, one of ordinary skill in the art would understand that the scope of the claimed disclosure is not to be limited by the above explicitly described embodiments but by the claims and equivalents thereof.

What is claimed is:

1. A method of operating an electronic apparatus for providing a user with information on management of a vehicle, the method comprising:
   generating a management scenario for the vehicle;
   requesting the user to approve the management scenario; and
   outputting management guide information, based on progress of the user's exiting and progress of the management scenario, wherein outputting the management guide information includes varying a timing, content, or output medium of the management guide information based on the progress of the user's exiting and progress of the management scenario,
   wherein the generating the management scenario comprises deciding one or more management tasks that are to be performed after the user exits, and
   wherein the management guide information includes:
      a position corresponding to the one or more management tasks included in the management scenario, and
      an expected required time and an expected required cost of the one or more management tasks, wherein the expected required cost is visually or audibly output to the user.

2. The method of claim 1, wherein the generating the management scenario further comprises deciding a sequence of the management tasks, and the one or more management tasks comprise one or more of a charging task, a repairing task, a car washing task, and a parking task.

3. The method of claim 1, wherein the generating the management scenario further comprises:
deciding whether to include a charging task in the management scenario, based on whether a difference between a travelable distance and a required travel distance of the vehicle is within a preset threshold.

4. The method of claim 1, wherein the generating the management scenario comprises:
acquiring management history information for one or more previously performed management tasks, wherein the management history information includes a date on which the one or more previously performed management task;
acquiring information on a management facility near a position where the vehicle is to be parked, for the one or more previously performed management tasks; and
deciding whether to include the one or more management tasks in the management scenario, based on the management history information and the information on a management facility.

5. The method of claim 1, wherein the generating the management scenario comprises:
deciding one or more first management tasks that are to be performed after the user exits; and
deciding one or more second management tasks that are to be performed after or before the one or more first management tasks, wherein the one or more second management tasks are selected by the user or selected based on management preference information generated from a previous management pattern of the user.

6. The method of claim 5, wherein the generating the management scenario further comprises:
generating a plurality of recommended scenarios respectively including different numbers of the one or more second management tasks or different execution orders between the one or more first management tasks and the one or more second management tasks; and
receiving selection for one of the plurality of recommended scenarios from the user.

7. The method of claim 1, wherein the requesting the user to approve comprises:
outputting, via a display or speaker provided in the vehicle, an approval request for the management scenario before the user arrives at a position where the user exits;
determining whether the user exits the vehicle without responding to the approval request; and
selectively transmitting the approval request to a user's terminal based on determining that the user exited without responding to the approval request.

8. The method of claim 7, wherein the outputting of the management guide information comprises outputting, based on determining that the user exited after having neither approved nor disapproved the approval request, a graphic object to at least one an exterior of the vehicle or a ground area adjacent to the vehicle, wherein the graphic object visually guides the user to respond to the approval request using the user's terminal.

9. The method of claim 1, wherein the outputting of the management guide information comprises outputting, based on determining that the user exited after approving the management scenario, a graphic object to at least one of an exterior of the vehicle or a ground area adjacent to the vehicle, wherein the graphic object includes a first message indicating that the management scenario has been approved and a second message indicating a management task that is to be performed first in the management scenario.

10. The method of claim 1, wherein the outputting of the management guide information comprises outputting, based on determining that the user has exited after disapproving the management scenario, a graphic object to at least one of an exterior of the vehicle or a ground area adjacent to the vehicle, wherein the graphic object indicates that a parking task is scheduled to be performed.

11. The method of claim 1, wherein the management guide information comprises:
information on a first management task that is one of the one or more management tasks included in the management scenario; and
information on a second management task in an order adjacent to the first management task.

12. The method of claim 11, wherein
the first management task is a management task that is being currently performed by the vehicle or a management task that is to be performed first by the vehicle after a current point in time, and
information on the second management task is information indicating that the second management task is completed before the first management task or information indicating that the second management task is scheduled to be performed after the first management task.

13. The method of claim 1, further comprising:
determining progress of the user's exiting, based on a position inside or outside the vehicle at which the user is detected and a door state of the vehicle,
wherein the exiting progress is determined as one of a state before the exiting, a state during the exiting, and a state where the exiting is completed,
wherein the timing, the content, or the output medium is changed based on the position at which the user is detected and the door state.

14. The method of claim 1, wherein
the outputting of the management guide information decides an outputting method the management guide information, based on the user's exiting progress,
the outputting method is determined by a combination of one or more of
a first method of visually outputting to at least one area inside the vehicle,
a second method of visually outputting to at least one area outside the vehicle,
a third method of audibly outputting to inside of the vehicle,
a fourth method of audibly outputting to outside of the vehicle, and
a fifth method of transmitting to a user's terminal, and
the outputting method is selected based on whether the user is before exiting, during the exiting, or after the exiting the vehicle.

15. The method of claim 14, wherein the at least one area inside the vehicle, to which the management guide information is visually output, is selected from among a plurality of candidate areas inside the vehicle based on a position at which the user us detected inside or outside the vehicle and a door state of the vehicle.

16. The method of claim 1, further comprising:
deciding a recommended destination by selecting among points of interest (POIs) within a preset distance from a position where the user exits, wherein the recommended destination is a destination suggested to the user as a candidate to visit after exiting the vehicle,
wherein the outputting of the management guide information outputs exiting guide information guiding a path from the position where the user exits to the recommended destination, along with the management guide information.

17. The method of claim 1, wherein the outputting of the management guide information comprises outputting exiting guide information that informs the user of a presence of luggage in the vehicle and a position where the luggage is loaded in the vehicle, along with the management guide information.

18. An apparatus for providing a user of a vehicle with information, the apparatus comprising a controller configured to:
generate a management scenario for the vehicle;
control an interface provided in the vehicle to request the user to approve the management scenario; and
control the interface to output management guide information based on progress of the user's exiting and progress of the management scenario,
wherein the controller is further configured to:
decide one or more management tasks that are to be performed after the user exits, and
vary a timing, content, or output medium of the management guide information based on the progress of the user's exiting and progress of the management scenario,
wherein the management guide information includes:
a position corresponding to the one or more management tasks included in the management scenario, and
an expected required time and an expected required cost of the one or more management tasks, wherein the expected required cost is visually or audibly output to the user.

19. A vehicle comprising the apparatus of claim 18.

20. A method of operating an electronic apparatus for providing a user with information on management of a vehicle, the method comprising:
generating a management scenario for the vehicle;
requesting the user to approve the management scenario; and
outputting management guide information, based on progress of the user's exiting and progress of the management scenario, wherein outputting the management guide information includes varying a timing, content, or output medium of the management guide information based on the progress of the user's exiting and progress of the management scenario,
wherein the outputting of the management guide information comprises outputting exiting guide information that informs the user of a presence of luggage in the vehicle and a position where the luggage is loaded in the vehicle, along with the management guide information.

* * * * *